(12) United States Patent
Ko et al.

(10) Patent No.: US 9,768,940 B2
(45) Date of Patent: Sep. 19, 2017

(54) METHOD AND DEVICE FOR TRANSMITTING AND RECEIVING SIGNAL IN MULTI-CELL COOPERATIVE COMMUNICATION SYSTEM

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Hyunsoo Ko, Anyang-si (KR); Kyungjun Choi, Seoul (KR); Kwangsoon Kim, Seoul (KR); Jaehoon Chung, Anyang-si (KR); Jinmin Kim, Anyang-si (KR)

(73) Assignees: LG ELECTRONICS INC., Seoul (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 171 days.

(21) Appl. No.: 14/647,011

(22) PCT Filed: Dec. 2, 2013

(86) PCT No.: PCT/KR2013/011054
§ 371 (c)(1),
(2) Date: May 22, 2015

(87) PCT Pub. No.: WO2014/088271
PCT Pub. Date: Jun. 12, 2014

(65) Prior Publication Data
US 2015/0304090 A1    Oct. 22, 2015

Related U.S. Application Data

(60) Provisional application No. 61/735,044, filed on Dec. 9, 2012.

(51) Int. Cl.
*H04L 5/00* (2006.01)
*H04B 7/024* (2017.01)
(Continued)

(52) U.S. Cl.
CPC .......... *H04L 5/0073* (2013.01); *H04B 7/024* (2013.01); *H04J 11/0036* (2013.01);
(Continued)

(58) Field of Classification Search
CPC ..... H04L 5/0073; H04L 5/0023; H04L 5/005; H04L 5/0035; H04J 11/0053; H04J 11/0036; H04W 72/085
See application file for complete search history.

(56) References Cited

U.S. PATENT DOCUMENTS 8,139,544 B1 * 3/2012 Webster ................. H04B 7/068
  370/203
8,170,081 B2 * 5/2012 Forenza ............... H04B 7/0417
  370/278

(Continued)

FOREIGN PATENT DOCUMENTS

WO    WO 2011/056607 A1    5/2011
WO    WO 2011/072156 A2    6/2011
WO    WO 2011/078571 A2    6/2011

OTHER PUBLICATIONS

Jose et al., titled "J. Jose, A. Ashikhmin, T. L. Marzetta and S. Vishwanath, "Pilot Contamination and Precoding in Multi-Cell TDD Systems," in IEEE Transactions on Wireless Communications, vol. 10, No. 8, pp. 2640-2651, Aug. 2011. doi: 10.1109/TWC.2011.060711.101155" (Jose hereinafter) was published Aug. 2011.*
(Continued)

*Primary Examiner* — Andrew Lai
*Assistant Examiner* — Hoyet H Andrews, III
(74) *Attorney, Agent, or Firm* — Birch, Stewart, Kolasch & Birch, LLP

(57) ABSTRACT

The present invention relates to a method of transmitting and receiving a signal in a wireless communication system. In particular, in a time division multi-cell cooperative communication system, a base station may receive a reference
(Continued)

signal, estimate a channel of each user terminal based on the reference signal, and determine a transmission and reception filter based on estimated channel information. The base station and a cooperative base station that cooperates with the base station may mutually exchange the reference signal and average signal power information on a terminal and determine the transmission and reception filter based on exchanged information.

15 Claims, 17 Drawing Sheets

(51) Int. Cl.
    *H04J 11/00*           (2006.01)
    *H04W 72/08*         (2009.01)

(52) U.S. Cl.
    CPC ........ *H04J 11/0053* (2013.01); *H04L 5/0023* (2013.01); *H04W 72/08* (2013.01); *H04L 5/005* (2013.01); *H04L 5/0035* (2013.01)

(56) References Cited

U.S. PATENT DOCUMENTS

| | | | | | |
|---|---|---|---|---|---|
| 8,923,423 | B2* | 12/2014 | Molnar | ................ | H04B 7/0417 375/267 |
| 9,077,417 | B2* | 7/2015 | Nammi | ................ | H04B 7/0619 |
| 9,100,067 | B2* | 8/2015 | Lee | ................ | H04B 7/0634 |
| 9,204,434 | B2* | 12/2015 | Chen | ................ | H04L 5/0051 |
| 9,490,942 | B2* | 11/2016 | Park | ................ | H04B 7/208 |
| 2003/0016737 | A1* | 1/2003 | Wu | ................ | H04B 1/7103 375/224 |
| 2005/0101259 | A1* | 5/2005 | Tong | ................ | H04B 7/0417 455/69 |
| 2005/0118993 | A1* | 6/2005 | Roux | ................ | H04B 7/022 455/423 |
| 2006/0093065 | A1* | 5/2006 | Thomas | ................ | H04B 7/0426 375/299 |
| 2007/0147536 | A1* | 6/2007 | Melzer | ................ | H04B 7/0417 375/267 |
| 2008/0013610 | A1* | 1/2008 | Varadarajan | ................ | H04B 7/0417 375/221 |
| 2008/0310486 | A1* | 12/2008 | Zhu | ................ | H04B 7/0417 375/149 |
| 2009/0168730 | A1* | 7/2009 | Baum | ................ | H04L 5/0007 370/336 |
| 2009/0245082 | A1* | 10/2009 | Narayan | ................ | H04J 11/004 370/201 |
| 2010/0034146 | A1* | 2/2010 | Hou | ................ | H04B 7/024 370/328 |
| 2011/0002371 | A1* | 1/2011 | Forenza | ................ | H04B 7/0417 375/227 |
| 2011/0176581 | A1* | 7/2011 | Thomas | ................ | H04B 1/7075 375/146 |
| 2011/0244816 | A1* | 10/2011 | Mori | ................ | H04B 7/0615 455/101 |
| 2011/0299617 | A1* | 12/2011 | Maddah-Ali | ................ | H04B 7/024 375/267 |
| 2012/0020319 | A1* | 1/2012 | Song | ................ | H04B 7/0632 370/330 |
| 2012/0051265 | A1 | 3/2012 | Shen et al. | | |
| 2012/0113897 | A1* | 5/2012 | Thiele | ................ | H04B 7/024 370/328 |
| 2012/0127949 | A1* | 5/2012 | Yoshimoto | ................ | H04J 11/0053 370/329 |
| 2012/0224499 | A1* | 9/2012 | Yoo | ................ | H04J 11/005 370/252 |
| 2012/0275411 | A1 | 11/2012 | Kim et al. | | |
| 2012/0281670 | A1* | 11/2012 | Tiirola | ................ | H04W 56/00 370/330 |

OTHER PUBLICATIONS

Ngo, Hien Quoc et al., titled "Energy and Spectral Efficiency of Very Large Multiuser MIMO Systems", (Ngo hereinafter) was originally published Dec. 2011, {Version 2: cited for this OA rejections) having a published date of May 21, 2012, pp. 01-31. Bibliographic Code: 2011arXiv1112.3810N.*

Zhang, Hongyuan et al., titled "Cochannel Interference Mitigation and Cooperative Processing in Downlink Multicell Multiuser MIMO Networks", (Zhang hereinafter) was published EURASIP Journal on Wireless Communications and Networking2004, 2004:202654, DOI: 10.1155/S1687147204406148, Received: Dec. 1, 2003 and Published: Dec. 22, 2004.*

Alcatel-Lucent et al., "On the need of SRS Enhancement for UL CoMP" 3GPP TSG RAN WG1 Meeting #68, Agenda Item: 7.5.6. 1.2, Dresden, Germany, Feb. 6-10, 2012, 4 pages, R1-120500.

* cited by examiner

FIG. 7
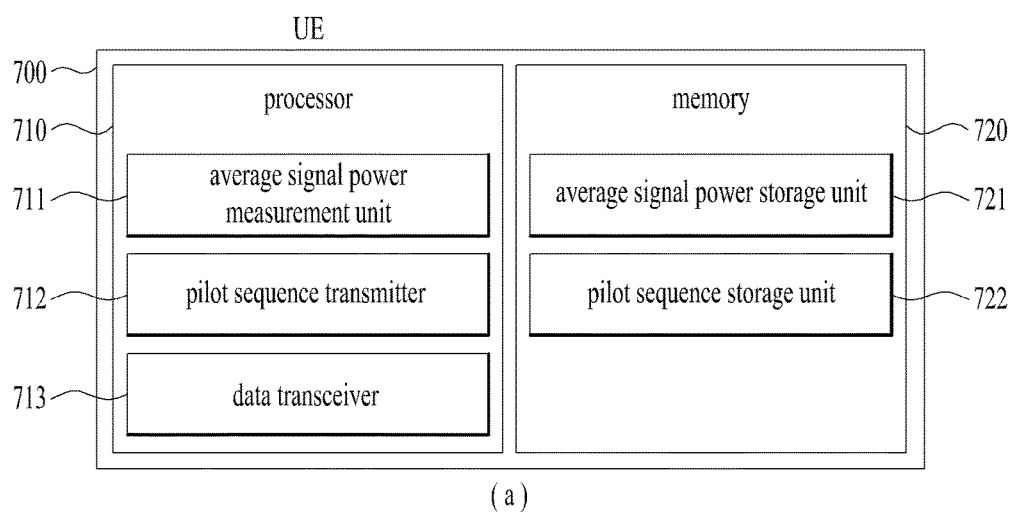
(a)
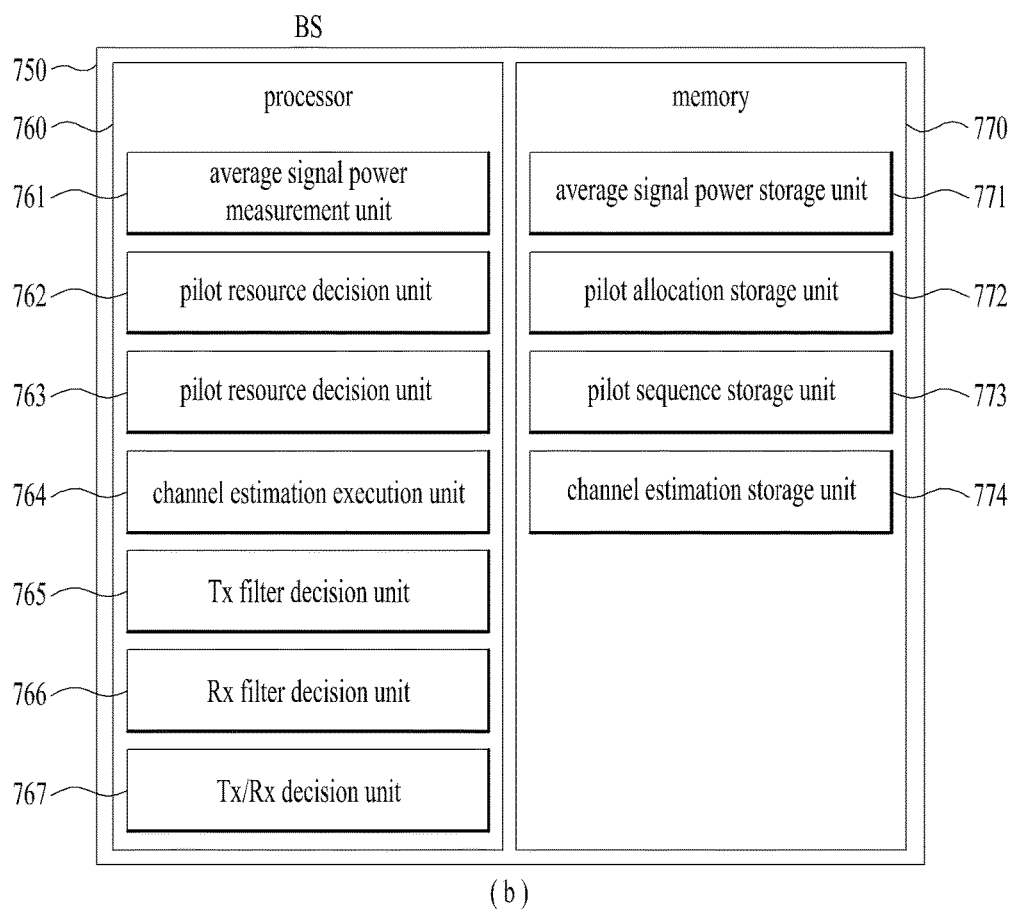
(b)

FIG. 13

METHOD AND DEVICE FOR TRANSMITTING AND RECEIVING SIGNAL IN MULTI-CELL COOPERATIVE COMMUNICATION SYSTEM

CROSS REFERENCE TO RELATED APPLICATIONS

This application is the National Phase of PCT/KR2013/011054 filed on Dec. 2, 2013, which claims priority under 35 U.S.C. 119(e) to U.S. Provisional Application No. 61/735,044 filed on Dec. 9, 2012, all of which are hereby expressly incorporated by reference into the present application.

TECHNICAL FIELD

The present invention relates to a wireless communication system, and more particularly to a method and apparatus for transmitting and receiving signals in a time division multi-cell cooperative communication. More specifically, the present invention relates to a method and apparatus for reducing signal interference by filtering transmission/reception (Tx/Rx) signals.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

Conventionally, one transmission (Tx) antenna and one reception (Rx) antenna are used. MIMO technology is an abbreviation for Multiple Input Multiple Output technology. MIMO technology uses a plurality of transmission (Tx) antennas and a plurality of reception (Rx) antennas to improve the efficiency of transmission and reception (Tx/Rx) of data. In other words, MIMO technology allows a transmission end or reception end of a wireless communication system to use multiple antennas (hereinafter referred to as multi-antenna technology), so that capacity or performance can be improved. For convenience of description, the term "MIMO" can also be considered to be multi-antenna technology.

In more detail, MIMO technology is not dependent on a single antenna path to receive a single message. Instead, MIMO technology collects a plurality of data fragments received via several antennas, merges the collected data fragments, and completes total data. As a result, MIMO technology can increase a data transfer rate within a predetermined-sized cell region, or can increase system coverage while guaranteeing a specific data transfer rate. Under this situation, MIMO technology can be widely applied to mobile communication terminals, repeaters, or the like. MIMO technology can extend the range of data communication, so that it can overcome the limited transmission (Tx) capacity of mobile communication systems.

The number of transmission (Tx) antennas in a transmitter is $N_T$, and the number of reception (Rx) antennas in a receiver is $N_R$. In this way, theoretical channel transmission capacity of the MIMO communication system increases when both the transmitter and the receiver use a plurality of antennas, as compared to another case in which only the transmitter or the receiver uses several antennas. The theoretical channel transmission capacity of the MIMO communication system increases in proportion to the number of antennas. Therefore, transfer rate and frequency efficiency are greatly increased. Provided that a maximum transfer rate acquired when a single antenna is used is set to $R_o$, a transfer rate acquired when multiple antennas are used can theoretically increase by a predetermined amount that corresponds to the maximum transfer rate ($R_o$) multiplied by a rate of increase $R_i$.

For example, provided that a MIMO system uses four transmission (Tx) antennas and four reception (Rx) antennas, the MIMO system can theoretically acquire a high transfer rate which is four times higher than that of a single antenna system. After the above-mentioned theoretical capacity increase of the MIMO system was demonstrated in the mid-1990s, many developers began to conduct intensive research into a variety of technologies which can substantially increase a data transfer rate using such theoretical capacity increase. Some of the above technologies have been implemented in a variety of wireless communication standards, for example, a next-generation wireless LAN, etc.

The MIMO system uses a plurality of Tx antennas and a plurality of Rx antennas, and can overcome the fading influence generated in a radio frequency (RF) channel through a plurality of Tx/Rx paths. Therefore, the MIMO system can increase data transfer rate and transmission quality as compared to a single antenna system. However, the MIMO system requires a sufficiently long distance between a plurality of antennas so as to obtain a high transfer rate. The base station (BS) transmits and receives signals within a large coverage, so that antennas spaced apart from each other by a sufficiently long distance can be installed between the BSs. However, actually, a miniaturized user equipment (UE) has difficulty in guaranteeing a sufficiently long distance. Therefore, a Multi-User MIMO system in which UEs having a single antenna can communicate with the BS having multiple antennas is being intensively researched as part of LTE-Advanced of the 3GPP.

In the multi-cell environment, a transfer rate and quality of a UE located at a cell edge are considerably deteriorated by an inter-cell interference (ICI) generated from neighbor cells. In order to overcome this issue, a frequency reuse scheme for reducing interference by allocating orthogonal frequency resources between contiguous cells may be used. However, the frequency reuse scheme can improve a transfer rate and quality of a UE located at a cell edge, and at the same time can deteriorate the transfer rate and quality of a total network. In order to address this issue, a Coordinated Multi-Point (CoMP) scheme based on coordination between multiple cells may be used to reduce ICI by efficiently employing frequency resources. This scheme forms a virtual MIMO system by exchanging channel information or data between multiple cells.

Channel information between antennas is needed for efficient data transmission/reception in the MU-MIMO system. A time division cellular system allows the BS to allocate pilot resources to a UE so as to obtain such channel information. The UE transmits a predetermined pilot sequence to the BS through the allocated pilot resources, and the BS may estimate channel information upon receiving pilots. The amount of necessary pilot resources increases in proportion to the number of UEs, and the amount of pilot resources is limited, so that it is impossible to allocate orthogonal pilot resources among multiple cells to all UEs. Therefore, it is impossible to perfectly estimate a UE channel due to the reuse of pilots, and Tx/Rx filters based on the estimated channel may generate unexpected interference. Performance deterioration caused by reuse of pilot resources may become serious in a cooperative cellular environment.

Therefore, in order to obtain a high transfer rate and high quality by suppressing interference in a multi-cell cooperative communication system, a process for controlling interference generated from pilots is required for the multi-cell cooperative communication system. In other words, the BS must allocate optimum pilot resources to each UE, and the BS must estimate a channel between UEs using given pilot resources, so that the BS must design Tx/Rx filters on the basis of the estimated channel. In addition, in order to maximize a transfer rate, a method for designing an optimum scheme between the above-mentioned steps is of importance. Therefore, a method for designing the improved Tx/Rx filter capable of removing inter-cell interference (ICI) and/or interference between UEs on the basis of the estimated channel is needed.

DISCLOSURE

Technical Problem

An object of the present invention is to provide a method and apparatus for transmitting and receiving signals in a wireless communication system. Another object of the present invention is to provide a method and apparatus for reducing signal interference in a MU-MIMO system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

In an aspect of the present invention, a method for transmitting and receiving a signal in a wireless communication system, receiving, by a base station (BS), pilot signals from a plurality of user equipments (UEs), estimating a communication channel associated with the plurality of user equipments (UEs) based on the pilot signals received by the base station (BS) and pilot signals received from the plurality of user equipments (UEs) by a cooperative base station (BS) cooperating with the base station (BS), obtaining channel information using the estimated communication channel, determining, by the base station (BS), a reception (Rx) filter using the obtained channel information, and removing an interference signal contained in a data signal received from a first user equipment (UE) among the plurality of user equipments (UEs) using the determined reception (Rx) filter, wherein the pilot signal received from the first user equipment (UE) is identical to at least one pilot signal among the pilot signals received from other user equipments (UEs) other than the first user equipment (UE) among the plurality of user equipments (UEs), and the reception (Rx) filter is configured to remove the interference signal by multiplying the data signal by a weight matrix, wherein the weight matrix is obtained by an average power of signals transmitted from the base station (BS) to the user equipment (UE).

In another aspect of the present invention, the reception (Rx) filter is configured to remove an interference signal contained in a signal filtered by a maximum ratio combining (MRC) filter using the data signal.

In another aspect of the present invention, the weight matrix is a pseudo-inverse matrix of an (L×S)-sized matrix, L is a total number of base stations (BSs), S is the number of UEs configured to transmit the same pilot signal.

In another aspect of the present invention, the interference signal is transmitted from user equipments (UEs) other than the first user equipment (UE) among the plurality of user equipments (UEs).

In another aspect of the present invention, the pilot signal is determined on based on the measured signal power information after the base station (BS) receives signal power information measured by at least one user equipment (UE) adjacent to the base station (BS)., In another aspect of the present invention, the pilot signal is determined based on UE average signal power information measured by the base station (BS).

In another aspect of the present invention, the average signal power information of the user equipment (UE) is exchanged between the base station (BS) and the cooperative base station (BS).

In another aspect of the present invention, the pilot signal is exchanged between the base station (BS) and the cooperative base station (BS).

In another aspect of the present invention, the pilot signal is allocated to the same resource block as in the pilot signal of the cooperative base station (BS).

In another aspect of the present invention, the pilot signal is allocated to a resource block orthogonal to the pilot signal of the cooperative base station (BS).

In another aspect of the present invention, the pilot signal is allocated to a resource block orthogonal to some parts of the pilot signal of the cooperative base station (BS).

In another aspect of the present invention, the pilot signal is different in size from the pilot signal of the cooperative base station (BS).

In another aspect of the present invention, if the number of user equipments (UEs) capable of performing channel estimation is less than the number of resource blocks to which the pilot signal is allocated, the user equipment (UE) transmits an orthogonal pilot signal to the base station (BS).

In another aspect of the present invention, if the number of user equipments (UEs) capable of performing channel estimation is higher than the number of resource blocks to which the pilot signal is allocated, the user equipment (UE) transmits the same pilot signal as pilot signals transmitted from other user equipments (UEs) to the base station (BS).

In another aspect of the present invention, the interference signal is gradually reduced in proportion to the number of antennas of the base station (BS).

In another aspect of the present invention, a method for transmitting and receiving a signal in a wireless communication system, receiving, by a base station (BS), a pilot signals from a plurality of user equipments (UEs), estimating a communication channel associated with the plurality of user equipments (UEs) based on the pilot signal received by the base station (BS) and pilot signals received from the plurality of user equipments (UEs) by a cooperative base station (BS) cooperating with the base station (BS), obtaining channel information using the estimated communication channel, determining, by the base station (BS), a transmission (Tx) filter using the obtained channel information, and filtering, by the base station (BS), data using the determined transmission (Tx) filter, and transmitting the filtered data to the plurality of user equipments (UEs), wherein the pilot signal received from the user equipment (UE) is identical to at least one pilot signal among the pilot signals received by the base station (BS) other user equipments (UEs), and the transmission (Tx) filter filters data to be transmitted by multiplying the data by a weight matrix, wherein the weight matrix is obtained by an average power of signals transmitted from the base station(BS) to the user equipment(UE).

In another aspect of the present invention, a base station (BS) apparatus for transmitting and receiving a signal in a wireless communication system, a transceiver and a processor, wherein the processor is configured to receive a pilot signals from a plurality of user equipments (UEs) using the transceiver, estimate a communication channel associated with the plurality of user equipments (UEs) based on the received pilot signals and pilot signals received from the plurality of user equipments (UEs) by a cooperative base station (BS) cooperating with the base station (BS), a cooperative base station (BS) cooperating with the base station (BS), obtain channel information using the estimated communication channel, determine a reception (Rx) filter using the obtained channel information, and remove an interference signal contained in a data signal received from a first user equipment (UE) acting as one of the pluralamong the plurality of user equipments (UEs) using the determined reception (Rx) filter, wherein the pilot signal received from the first user equipment (UE) is identical to at least one pilot signal among the pilot signals received from other user equipments (UEs) other than the first user equipment (UE) among the plurality of user equipments (UEs), and the reception (Rx) filter removes the interference signal by multiplying the data signal by a weight matrix, wherein the weight matrix is obtained by an average power of signals transmitted from the base station(BS) to the user equipment (UE).

Advantageous Effects

As is apparent from the above description, the embodiments of the present invention can efficiently transmit and receive a reference signal (RS) and a data signal in a wireless communication system. In more detail, the embodiments can reduce Inter-Cell Interference (ICI) by filtering Tx/Rx signals.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 7 is a block diagram illustrating a UE and a BS according to an embodiment.

FIG. 13 illustrates various formats of pilot resources applied to the present invention.

BEST MODE

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

In a wireless communication system, the UE may receive information from the base station (BS) via a downlink, and may transmit information via an uplink. The information that is transmitted and received to and from the UE includes data and a variety of control information. A variety of physical channels are used according to categories/usages of transmission (Tx) and reception (Rx) information of the UE.

Figure 1:
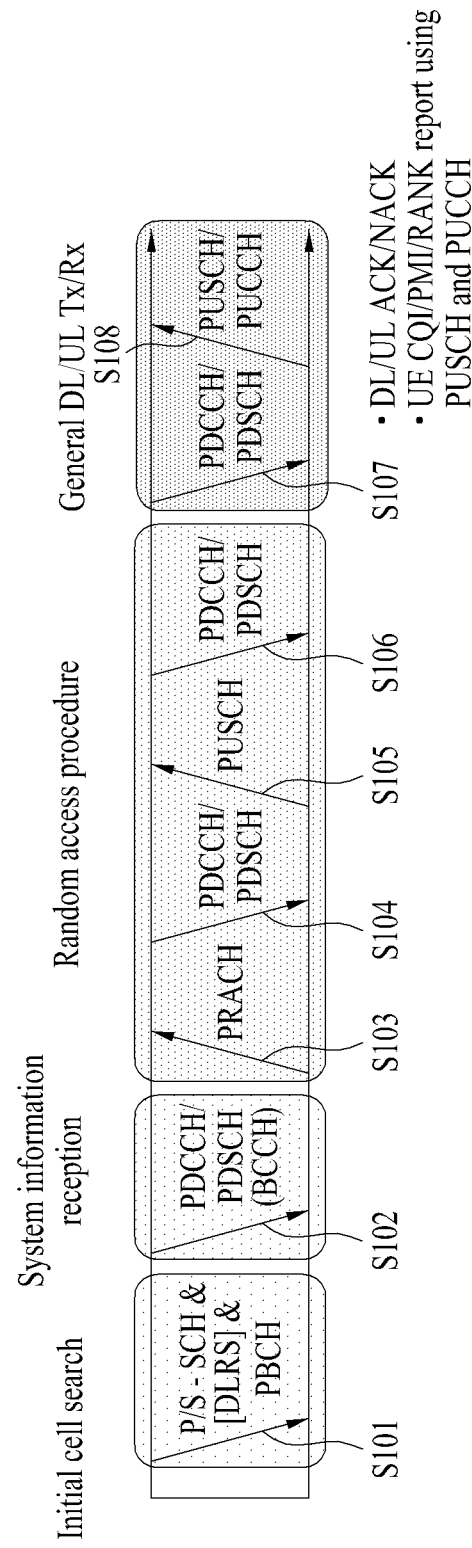
FIG. 1 is a conceptual diagram illustrating physical channels used in a 3GPP LTE system as an exemplary wireless communication system and a general method for transmitting a signal using the physical channels.

FIG. 1 is a diagram showing physical channels used in a 3GPP system and a general signal transmission method using the same.

A UE performs an initial cell search procedure such as establishment of synchronization with a BS when power is turned on or the UE enters a new cell (step S101). The UE may receive a Primary Synchronization Channel (P-SCH) and a Secondary Synchronization Channel (S-SCH) from the BS to establish synchronization with the BS and acquire information such as a cell identity (ID). Thereafter, the UE may receive a physical broadcast channel from the BS to acquire broadcast information within the cell. Meanwhile, the UE may receive a Downlink Reference Signal (DL RS) in the initial cell search step to confirm a DL channel state.

Upon completion of the initial cell search procedure, the UE may receive a Physical Downlink Control Channel (PDCCH) and a Physical Downlink Shared Channel (PDSCH) according to information included in the PDCCH to acquire more detailed system information (step S102).

Meanwhile, if the UE initially accesses the BS or if radio resources for signal transmission are not present, the UE may perform a random access procedure (steps S103 to S106) with respect to the BS. To this end, the UE may transmit a specific sequence through a Physical Random Access Channel (PRACH) as a preamble (steps S103 and S105), and receive a response message to the preamble through the PDCCH and the PDSCH corresponding thereto (steps S104 and S106). In the case of a contention-based RACH, a contention resolution procedure may be additionally performed.

After the above random access procedure, the UE may receive a PDCCH/PDSCH (S107) and transmit a Physical Uplink Shared CHannel (PUSCH)/Physical Uplink Control CHannel (PUCCH) (S108) in a general uplink/downlink signal transmission procedure. Control information that the UE transmits to the BS is referred to as uplink control information (UCI). The UCI includes a Hybrid Automatic Repeat and reQuest ACKnowledgment/Negative-ACK (HARQ ACK/NACK) signal, a Scheduling Request (SR), a Channel Quality Indicator (CQI), a Precoding Matrix Indicator (PMI), a Rank Indicator (RI), etc. In the present specification, HARQ ACK/NACK is briefly referred to as HARQ-ACK or ACK/NACK (A/N). HARQ-ACK includes at least one of a positive ACK (ACK), a negative ACK (NACK), DTX and NACK/DTX. The UCI is transmitted on a PUCCH, in general. However, the UCI can be transmitted on a PUSCH when control information and traffic data need to be transmitted simultaneously. Furthermore, the UCI can be aperiodically transmitted on a PUSCH at the request/instruction of a network.

Figure 2:
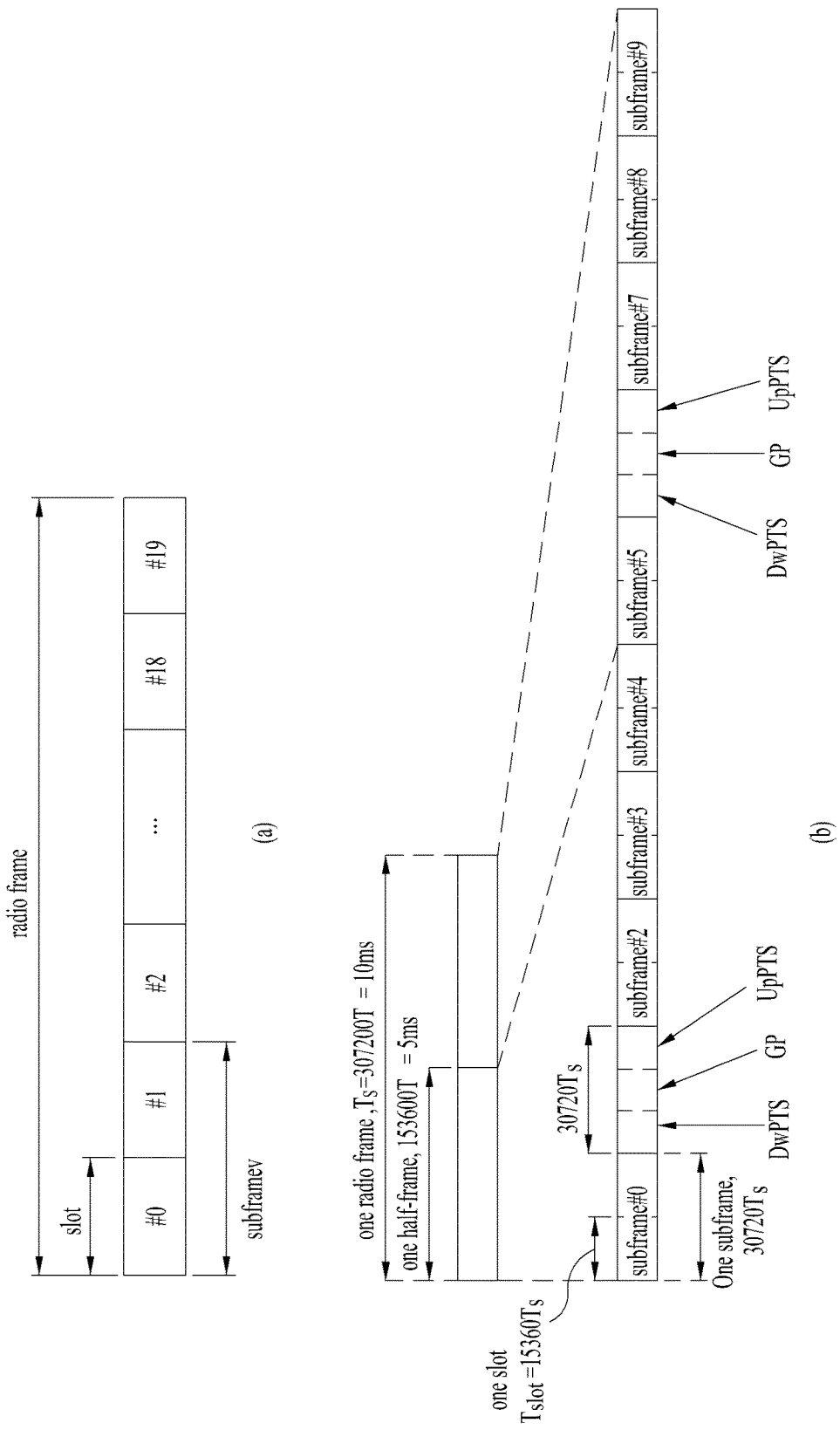
FIG. 2 exemplarily shows a radio frame structure.

Frame structure is described with reference to FIG. 2 as follows. In a cellular OFDM radio packet communication system, UL/DL (uplink/downlink) data packet transmission is performed by a unit of subframe. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2(a) is a diagram for a structure of a downlink radio frame of type 1. A DL (downlink) radio frame includes 10 subframes. Each of the subframes includes 2 slots. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain or may include a plurality of resource blocks (RBs) in frequency domain. Since 3GPP system uses OFDMA in downlink, OFDM symbol indicates one symbol duration. The OFDM symbol may be named SC-FDMA symbol or symbol duration. Resource block (RB) is a resource allocation unit and may include a plurality of contiguous subcarriers in one slot.

The number of OFDM symbols included in one slot may vary in accordance with a configuration of CP. The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may be able to use the extended CP to further reduce the inter-symbol interference.

When a normal CP is used, since one slot includes 7 OFDM symbols, one subframe includes 14 OFDM symbols. In this case, first 2 or 3 OFDM symbols of each subframe may be allocated to PDCCH (physical downlink control channel), while the rest of the OFDM symbols are allocated to PDSCH (physical downlink shared channel).

FIG. 2(b) is a diagram for a structure of a downlink radio frame of type 2. A type-2 radio frame includes 2 half frames. Each of the half frame includes 5 subframes, DwPTS (downlink pilot time slot), GP (guard period) and UpPTS (uplink pilot time slot). And, one of the subframes includes 2 slots. The DwPTS is used for initial cell search, synchronization or channel estimation in a user equipment. The UpPTS is used for channel estimation in a base station and uplink transmission synchronization of a user equipment. The guard period is a period for eliminating interference generated in uplink due to multi-path delay of a downlink signal between uplink and downlink. Meanwhile, one subframe includes 2 slots irrespective of the type of the radio frame.

The above-described structures of the radio frame are just exemplary. And, the number of subframes included in a radio frame, the number of slots included in the subframe and the number of symbols included in the slot may be modified in various ways.

Figure 3:
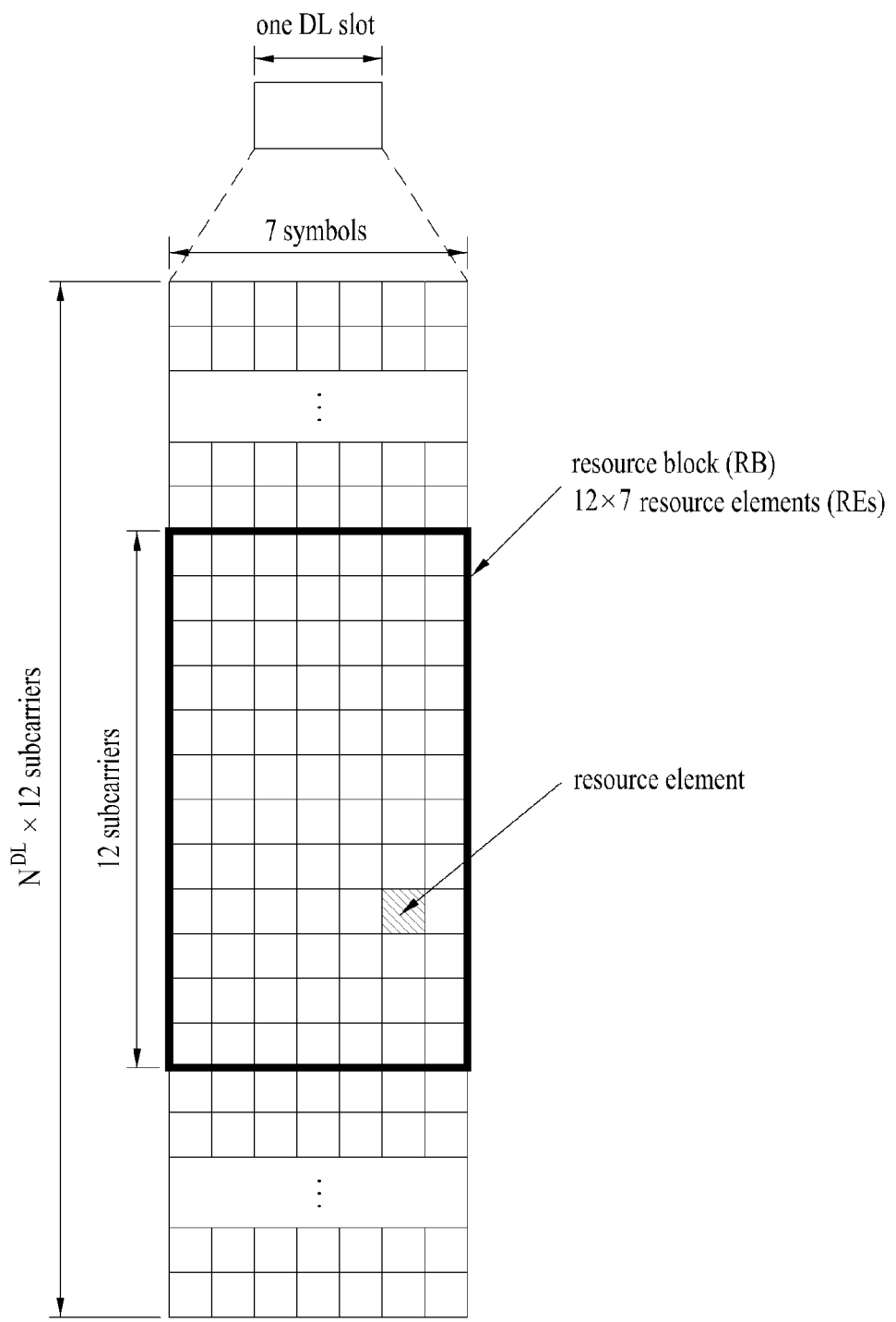
FIG. 3 exemplarily shows a resource grid of a downlink slot.

FIG. 3 is a diagram for one example of a resource grid for a downlink (DL) slot.

Referring to FIG. 3, one downlink (DL) slot may include 7 OFDM symbols and one resource block (RB) may include 12 subcarriers, by which the present invention may be non-limited. For instance, in case of a normal cyclic prefix (CP), one slot includes 7 OFDM symbols. Yet, in case of an extended CP, one slot may include 6 OFDM symbols. Each element on a resource grid may be named a resource element (hereinafter abbreviated RE). one resource block includes 12 7 resource elements. The number NDL of resource blocks included in a DL slot may depend on a DL transmission bandwidth. And, the structure of an uplink (UL) slot may be identical to that of the DL slot.

Figure 4:
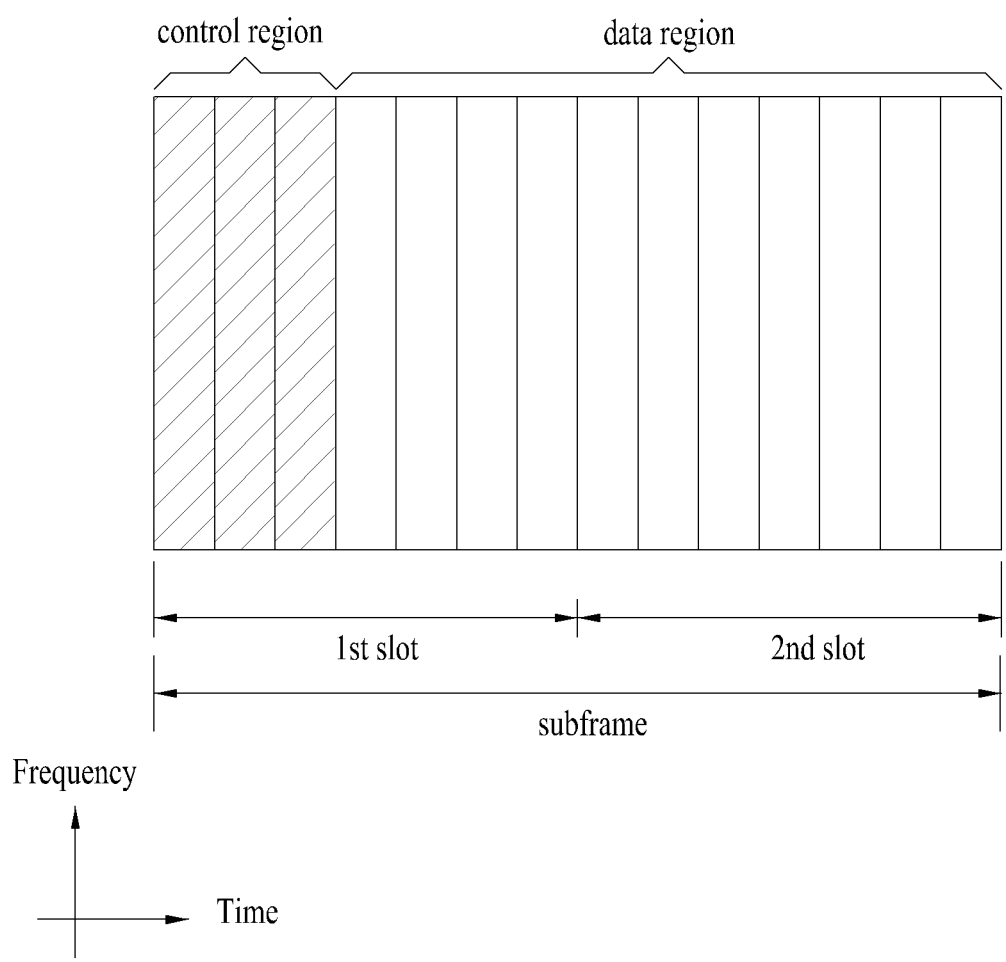
FIG. 4 exemplarily shows a downlink frame structure.

FIG. 4 is a diagram for a structure of a downlink (DL) subframe.

Referring to FIG. 4, Maximum 3 OFDM symbols situated in a head part of a first slot of one subframe correspond to a control region to which a control channel is allocated. The rest of OFDM symbols correspond to a data region to which PDSCH (physical downlink shared channel) is allocated. A basic unit of transmission becomes one subframe. In particular, PDCCH and PDSCH are assigned across 2 slots.

Examples of DL control channels used by 3GPP LTE system may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and includes information on the number of OFDM symbols used for a transmission of a control channel within the subframe. The PHICH includes HARQ ACK/NACK signal in response to a UL transmission.

Control information carried on PDCCH may be called downlink control information (DCI). The DCI may include UL or DL scheduling information or a UL transmission power control command for a random UE (user equipment) group.

The PDCCH may include transmission format and resource allocation information of DL-SCH (downlink shared channel), resource allocation information on UL-SCH (uplink shared channel), paging information on PCH (paging channel), system information on DL-SCH, resource allocation of such a higher layer control message as a random access response transmitted on PDSCH, transmission power control command set for individual UEs within a random UE group, transmission power control information, activation of VoIP (voice over IP) and the like. A plurality of PDCCHs can be transmitted within the control region. A user equipment may be able to monitor a plurality of the PDCCHs. The PDCCH is transmitted as an aggregation of at least one or more contiguous CCEs (control channel elements). The CCE is a logical allocation unit used to provide the PDCCH at a coding rate based on a radio channel status. The CCE may correspond to a plurality of REGs (resource element groups). A format of the PDCCH and the number of available PDCCH bits may be determined in accordance with correlation between the number of CCEs and a coding rate provided by the CCE. A base station determines a PDCCH format in accordance with a DCI which is to be transmitted to a user equipment and attaches a CRC (cyclic redundancy check) to control information. The CRC is masked with an identifier named RNTI (radio network temporary identifier) in accordance with an owner or usage of the PDCCH. For instance, if the PDCCH is provided for a specific user equipment, the CRC may be masked with an identifier (e.g., cell-RNTI (C-RNTI)) of the corresponding user equipment. In case that the PDCCH is provided for a paging message, the CRC may be masked with a paging indicator identifier (e.g., P-RNTI). If the PDCCH is provided for system information (particularly, for a system information block (SIC)), the CRC may be masked with a system information identifier and a system information RNTI (SI-RNTI). In order to indicate a random access response to a transmission of a random access preamble of a user equipment, the CRC may be masked with RA-RNTI (random access-RNTI).

Figure 5:
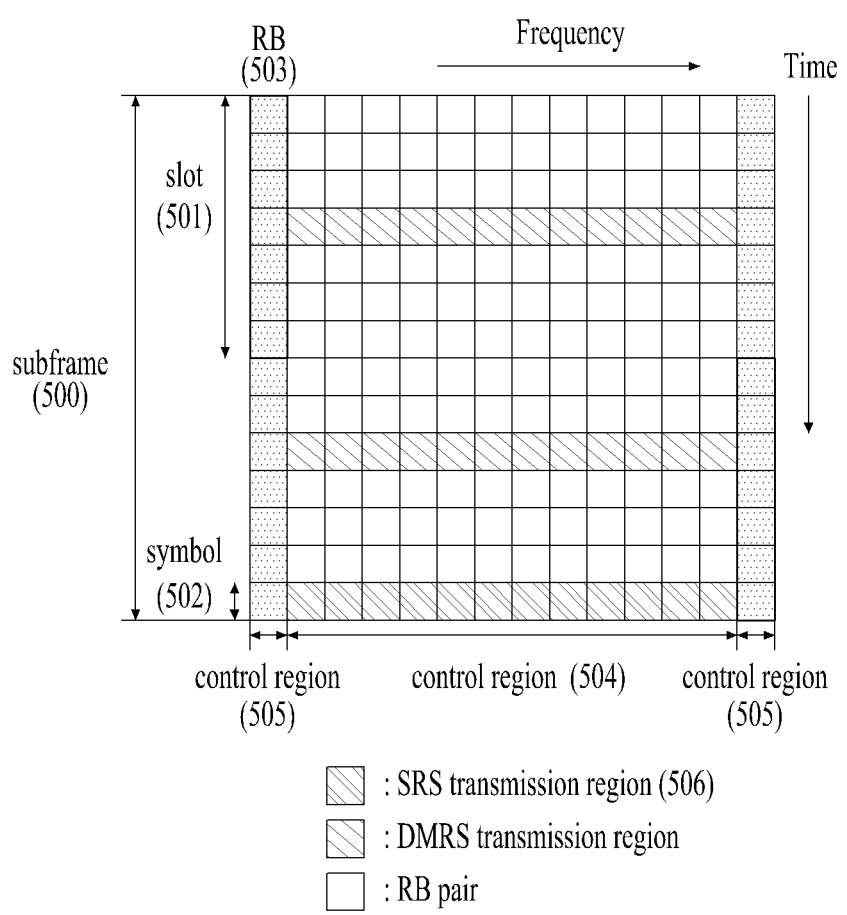
FIG. 5 exemplarily shows an uplink subframe structure.

FIG. 5 exemplarily shows an uplink subframe structure.

Referring to FIG. 5, a subframe 500 having a length of 1 ms, which is a basic unit of LTE uplink transmission, includes two 0.5 ms slots 501. Assuming a normal Cyclic Prefix (CP) length, each slot includes 7 symbols 502 and one symbol corresponds to one SC-FDMA symbol. A resource block 503 is a resource allocation unit corresponding to 12 subcarriers in a frequency domain and one slot in a time domain. The structure of the LTE uplink subframe is broadly divided into a data region 504 and a control region 505. The data region includes a PUSCH and is used to transmit a data signal such as voice. The control region includes a PUCCH and is used to transmit control information. The PUCCH includes a pair of RBs located at both ends of the data region on the frequency axis and hops between slots.

The PUCCH can be used to transmit the following control information.

Scheduling Request (SR): This is information used to request a UL-SCH resource and is transmitted using On-Off Keying (OOK).

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

Channel Quality Indicator (CQI): This is feedback information about a downlink channel. Feedback information regarding MIMO includes a rank indicator (RI) and a precoding matrix indicator (PMI). 20 bits are used per subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 1 shows the mapping relationship between PUCCH formats and UCI in LTE -A.

TABLE 1

| PUCCH format | UCI (Uplink Control Information) |
| --- | --- |
| Format 1 | SR (scheduling request) (unmodulated waveform) |
| Format 1a | 1-bit HARQ ACK/NACK (SR present/absent) |
| Format 1b | 2-bit HARQ ACK/NACK (SR present/absent) |
| Format 2 | CQI (20 coded bits) |
| Format 2 | CQI and 1- or 2-bit HARQ ACK/NACK (20 bits) (corresponding to only extended CP) |
| Format 2a | CQI and 1-bit HARQ ACK/NACK (20 + 1 coded bits) |
| Format 2b | CQI and 2-bit HARQ ACK/NACK (20 + 2 coded bits) |

Sounding Reference Signal (SRS) is transmitted through the last SC-FDMA symbol in one subframe in the time domain. SRSs of multiple UEs, which are transmitted through the same SC-FDMA symbol, can be identified according to frequency position/sequence.

SRS is periodically transmitted. Configuration for periodic SRS transmission is achieved by a cell-specific SRS parameter and a UE-specific SRS parameter. The cell-specific SRS parameter (in other words, cell-specific SRS configuration) and the UE-specific SRS parameter (in other words, UE-specific SRS configuration) are transmitted to a UE through higher layer (e.g. RRC) signaling. Similarly, in case of a relay system, SRS configuration for a relay is configured by a cell-specific SRS parameter and an RN-specific SRS parameter.

The cell-specific SRS parameter may include "srs-BandwidthConfig" and "srs-SubframeConfig". srs-BandwidthConfig may indicate information regarding a frequency band in which SRS can be transmitted, and srs-SubframeConfig may indicate information regarding a subframe in which SRS can be transmitted. The subframe in which SRS can be transmitted within a cell may be periodically established within a frame. Table 2 may indicate 'srs-SubframeConfig' from among cell-specific SRS parameters.

TABLE 2

| srs-SubframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | Reserved |

$T_{SFC}$ is cell-specific subframe configuration, and $\Delta_{SFC}$ is a cell-specific subframe offset. srs-SubframeConfig is provided through a higher layer (e.g., RRC layer). SRS is transmitted through a subframe satisfying $\lfloor n_s/2 \rfloor \bmod T_{SFC} \in \Delta_{SFC}$. $n_S$ is a slot index. "$\lfloor \ \rfloor$" is a flooring function, and "mod" is a modulo operation.

The UE-specific SRS parameter includes srs-Bandwidth, srs-HoppingBandwidth, freqDomainPosition, srs-ConfigIndex, transmissionComb and cyclicShift. srs-Bandwidth indicates a value used to set a frequency bandwidth in which a UE should transmit an SRS. srs-HoppingBandwidth indicates a value used to set frequency hopping of an SRS. freqDomainPosition indicates a value used to determine a frequency position where an SRS is transmitted. srs-ConfigIndex indicates a value used to set a subframe in which a UE should transmit an SRS. transmissionComb indicates a value used to set an SRS transmission Comb. cyclicShift indicates a valued used to set a cyclic shift value applied to an SRS sequence.

Tables 3 and 4 show an SRS transmission periodicity and a subframe offset according to srs-ConfigIndex. The SRS transmission periodicity indicates a time interval (unit: subframe or ms) in which a UE should periodically transmit an SRS. Table 3 shows an FDD case and Table 4 shows a TDD case. The SRS configuration index $I_{SRS}$ is signaled per UE and each UE confirms the SRS transmission periodicity $T_{SRS}$ and the SRS subframe offset $T_{offset}$ using the SRS configuration index $I_{SRS}$.

TABLE 3

| SRS Configuration Index ISRS | SRS Periodicity $T_{SRS}$ (ms) | SRS Subframe Offset $T_{offset}$ |
|---|---|---|
| 0-1 | 2 | ISRS |
| 2-6 | 5 | ISRS − 2 |
| 7-16 | 10 | ISRS − 7 |
| 17-36 | 20 | ISRS − 17 |
| 37-76 | 40 | ISRS − 37 |
| 77-156 | 80 | ISRS − 77 |
| 157-316 | 160 | ISRS − 157 |
| 317-636 | 320 | ISRS − 317 |
| 637-1023 | reserved | reserved |

TABLE 4

| Configuration Index ISRS | SRS Periodicity $T_{SRS}$ (ms) | SRS Subframe Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | ISRS − 10 |
| 15-24 | 10 | ISRS − 15 |
| 25-44 | 20 | ISRS − 25 |
| 45-84 | 40 | ISRS − 45 |
| 85-164 | 80 | ISRS − 85 |
| 165-324 | 160 | ISRS − 165 |
| 325-644 | 320 | ISRS − 325 |
| 645-1023 | reserved | reserved |

In summary, in the existing LTE, the cell-specific SRS parameter indicates subframes occupied for SRS transmission within a cell to a UE and the UE-specific SRS parameter indicates subframes, which will actually be used by the UE, among the subframes occupied for SRS transmission. The UE periodically transmits an SRS through a specific symbol (e.g., a last symbol) of the subframe specified as the UE-specific SRS parameter.

On the other hand, in order to protect SRS transmission from subframes occupied through cell-specific SRS parameters, the UE need not transmit uplink signals through the last symbol of a subframe irrespective of actual transmission or non-transmission of SRS in the corresponding subframe.

The embodiments of the present invention have been described based on data transmission and reception between a base station (BS) and a user equipment (UE). A specific operation which has been described as being performed by the base station (BS) may be performed by an upper node of the base station (BS) as the case may be. In other words, it will be apparent that various operations performed for communication with the user equipment (UE) in the network which includes a plurality of network nodes along with the base station (BS) can be performed by the base station (BS) or network nodes other than the base station (BS). The base station (BS) may be replaced with terms such as fixed station, Node B, eNode B (eNB), and access point (AP). Also, the user equipment (UE) may be replaced with terms such as mobile station (MS) and mobile subscriber station (MSS). In addition, a reference signal (RS) may be replaced with terms such as a pilot signal, a pilot resource, a pilot sequence, etc.

MIMO System

The most important characteristic of a virtual multiple antenna system is that signals are transmitted and received through many more antennas than in legacy LTE-Advanced. As well known to those skilled in the art, transmission capacity C of a virtual multiple antenna system in which the number of antennas is set to N and the number of UEs is set to K is approximated to Signal to Noise Ratio (SNR) as represented by the following equation 1.

$$C \approx \min(N, K) \log(SNR) \quad \text{[Equation 1]}$$

As can be seen from Equation 1, if the number (N) of antennas and the number (K) of UEs increase, a large amount of transmission capacity can be increased. However, the following two assumptions are needed for the transmission capacity of Equation 1.

Assumption 1) BS has already recognized channels among all BS antennas and all UEs. In this case, a cost needed for channel recognition is discarded.

Assumption 2) BS may use an optimum Tx/Rx method capable of obtaining maximum transmission capacity. In downlink, Dirty-Paper Code (DPC) is used. In uplink, minimum mean-square error successive interference cancellation (MMSE-SIC) is used.

As the number of antennas increases, the above-mentioned two assumptions 1 and 2 are gradually mismatched with reality. In order to perfectly recognize a channel, each UE requires an orthogonal pilot sequence, and a pilot must be transmitted with relatively high power. In this case, pilot resources O(K) for allocating orthogonal pilot sequences to K UEs are increased in proportion to the number of UEs. Therefore, transmission capacity of a MIMO system is limited by allocated pilot resources. In addition, as the number of BS antennas increases, it is impossible to use the DPC scheme or the MMSE-SIC scheme due to calculation complexity. Furthermore, although a simple linear filter is used, the maximum ratio transmission/combining (MRT/C) case has O(NK) and also has complexity of the zero-forcing (ZF) case, so that it is impossible to increase the number of antennas capable of being simultaneously used by the BS beyond a predetermined number. Accordingly, transmission capacity of the system is limited by calculation complexity of a given Tx/Rx filter.

The present invention is focused on a solution of the first assumption from among the above-mentioned assumptions so as to achieve a large transmission capacity through communication between multiple antennas and multiple UEs. In order to reduce limitation of pilot resources, the present invention relates to the Tx/Rx filter design scheme using information of a coordinated BS, pilot allocation information, and average power information between UE and BS. In the case of using the proposed scheme, assuming that the number of coordinated BSs is set to L, data may be transmitted and received only using a maximum number (L) of pilot resources as compared to the conventional art, or the BS can simultaneously communicate with many UEs corresponding to a maximum of L times. Furthermore, the pilot reuse factor for each UE is adaptively adjusted, network transmission capacity can be increased.

Multi-Cell Cooperative Communication System

Figure 6:
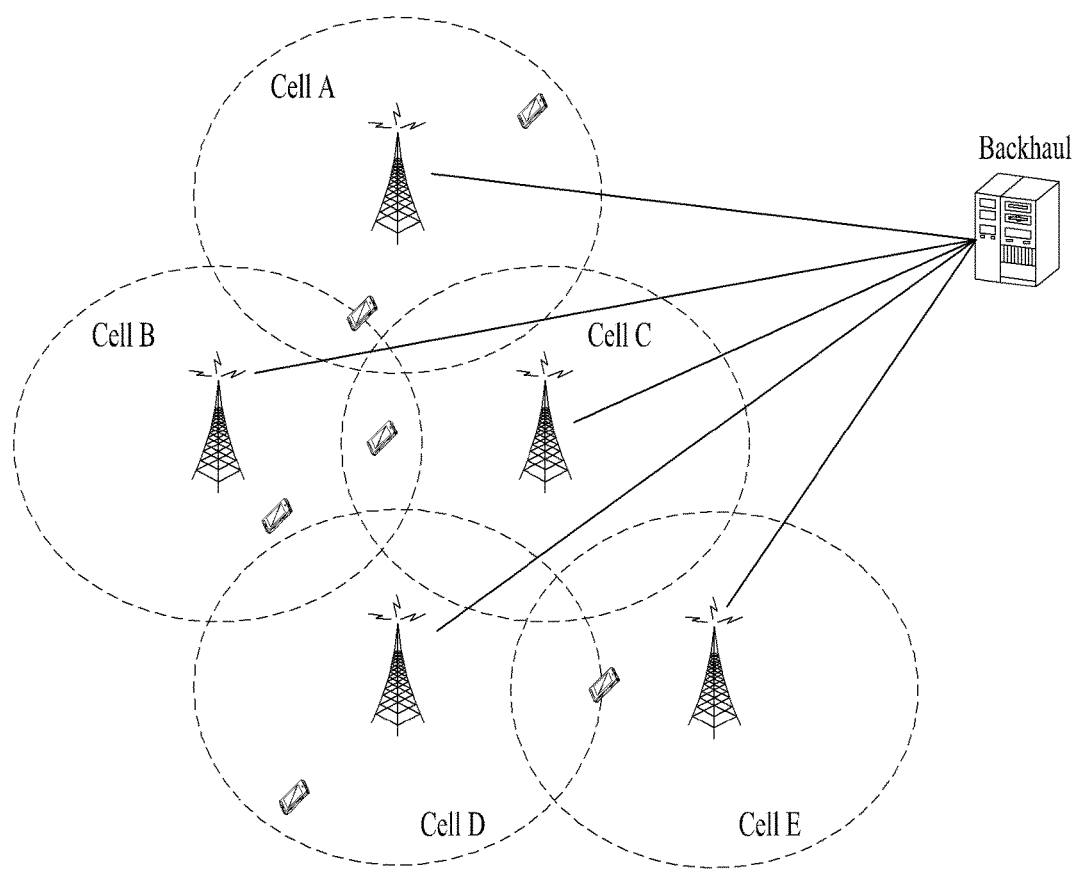
FIG. 6 is a conceptual diagram illustrating a multi-cell cooperative communication system.

FIG. 6 is a conceptual diagram illustrating a multi-cell cooperative communication system.

A plurality of BSs constructing a multi-cell cooperative communication system may include not only BSs controlling general cells, such as a macro cell, a micro cell, and a femto cell, but also a relay node. Therefore, a multi-cell cooperative communication system according to the embodiment can be applied to various cooperative communication schemes, for example, cooperative communication based on general cells, cooperative communication of relay nodes, cooperative communication of general cells and relay nodes, etc.

Referring to FIG. 6, in multi-cell cooperative communication (Coordinated Multi Point: CoMP), a plurality of contiguous BSs (A to E of FIG. 6) may be coupled to a central processor through a backhaul. Coordinated BSs may have different antennas. For convenience of description, it is assumed that each BS has the same number M (M=1, 2, . . . ) of antennas. The number of cooperative BSs (coordinated BSs) may be decided by a backhaul connection/disconnection state and a network environment, where L (L=1, 2, . . . ). K UEs to be communicated may be distributed in a cell, and individual UEs may have different numbers of antennas. For convenience of description, it is assumed that all UEs have a single antenna. The UE having multiple antennas may consider that individual antennas are different from each other. A downlink channel between the L-th Radio Unit (RU) port (i.e., the L-th BS port) and the K-th UE is represented by the following equation 2.

$$g_{lk} = \sqrt{\beta_{lk}} h_{lk} \quad [\text{Equation 2}]$$

In Equation 2, $\beta_{lk}$ is average signal power between the L-th RU port and the K-th UE, and $h_{lk}$ is a vector channel having a dispersion of 1. The average signal power is determined not only by path attenuation caused by a distance between the port and the UE, but also by shadowing, so that the average signal power remains unchanged for a long period of time. However, $h_{lk}$ is affected by signal attenuation or supplementary interference, and remains unchanged for a short period of time.

The cooperative communication system may be classified according to the position of a signal processor. A distributed antenna system transmits inter-BS information through a backhaul, transmits/receives data using a processor of each BS, and transmits BS information to a central processor through a backhaul, so that the resultant information can be collectively processed by the central processor. The backhaul network may be any of a first network having higher transmission capacity as compared to the RF channel, and a second network having limited transmission capacity. In the case of the first network, signals can be communicated between BSs without loss. In the case of the second network, transmission loss may occur in a backhaul network.

FIG. 7 is a block diagram illustrating a UE and a BS according to an embodiment.

FIG. 7(a) is a block diagram illustrating a processor 710 and a memory 720 for controlling a UE apparatus 700 according to an embodiment. FIG. 7(b) is a block diagram illustrating a processor 760 and a memory 770 for controlling a BS apparatus 750 according to an embodiment.

Referring to FIG. 7(a), a processor 710 of the UE 700 may include an average signal power measurement unit 711, a pilot sequence transmitter 712, and a data transceiver 713. The average signal power measurement unit 721 allows the UE to accumulate the average signal power received from a contiguous-cell BS (including a current cell of the UE), so that the average signal power measurement unit 721 measures the accumulated average signal power, and feeds back the measured result to the BS. Upon receiving the average signal power fed back from the UE, the BS may use the received average signal power for various purposes, i.e., pilot resource distribution, pilot sequence allocation, Tx filter design, and Rx filter design. The pilot sequence transmitter 712 receives pilot resources from the BS, and transmits a pilot sequence corresponding to the pilot sequence index through the allocated pilot resources. The data transceiver 713 may transmit data to the BS, and may receive a data signal from the BS.

Referring to FIG. 7(a), a UE memory may include an average signal power storage unit 721 and a pilot sequence storage unit 722. The average signal power storage unit 721l may continuously accumulate the average signal power measured by the UE, and store the accumulated average signal power. The storage average signal power may be fed back to the BS at intervals of a predetermined time. The pilot sequence storage unit 722 may store the pilot sequence predetermined by a system. The pilot sequence storage unit 722 may store the pilot sequence corresponding to all available pilot resources supported by the system.

Referring to FIG. 7(*b*), the processor 760 of the BS 750 may include an average signal power measurement unit 761, a pilot resource decision unit 762, a pilot sequence decision unit 763, a channel estimation execution unit 762, a Tx filter decision unit 765, an Rx filter decision unit 766, and a Tx/Rx decision unit 767. The average signal power measurement unit 761 may allow the BS 750 to accumulate the average signal power received from a UE (including a UE of a current cell) of a contiguous cell, so that the accumulated average signal power is measured. The measured average signal power may be applied to the pilot resource decision unit 762, the pilot sequence decision unit 763, the channel estimation execution unit 764, the Tx filter decision unit 765, and the Rx filter decision unit 766. The pilot resource decision unit 762 may determine which resources among resources supported by the system will be used as pilot resources, and may also determine how much resources will be used as pilot resources. The pilot sequence decision unit 763 may allocate a pilot sequence corresponding to the decided pilot resource to UEs. For example, if the number of UEs is higher than the number of given pilot sequences, the pilot sequences may be repeatedly allocated to the UE. The channel estimation execution unit 764 may collect pilot sequences that have been transmitted in uplink through pilot resources allocated to the UE, so as to estimate a channel of UEs. For example, various methods for estimating channel information may be used, for example, Least-Square (LS) channel estimation method, minimum mean-square error (MMSE) channel estimation method, maximum likelihood (ML) channel estimation method, etc. The Tx filter decision unit 765 may design a Tx filter (or a precoder) used in downlink through which the BS transmits data to cooperative UEs. For example, the Tx filter for maximizing a transfer rate and quality using average signal power information of the UE, pilot allocation information, and channel estimation information may be designed. The Rx filter decision unit 766 may design the Rx filter (or the post-coder) used in uplink through which the cooperative UEs transmit data to the BS 750. For example, the Rx filter for maximizing a transfer rate and quality using average signal power information of the UE, pilot allocation information, and channel estimation information may be designed. The Tx/Rx decision unit 767 may decide UEs to be used for transmission and reception on the basis of the Tx/Rx filters. For example, a method for selecting all UEs, a method for selecting one UE, a method for selecting a plurality of UEs, etc. may be implemented.

Referring to FIG. 7(*b*), a memory 770 of the BS 750 may include an average signal power storage unit 771, a pilot allocation storage unit 772, a pilot sequence storage unit 773, and a channel estimation storage unit 774. The average signal power storage unit 771 may store the average signal power between the UE and the BS. For example, the BS 750 may accumulate and store the measured average signal power, and the UE may store the average signal power fed back to the BS 750. The pilot allocation storage unit 772 may store pilot information allocated by the BS. The pilot sequence storage unit 773 may store the pilot sequence predetermined by the system. The channel estimation storage unit 774 may store channel estimation information obtained from the channel estimation execution process.

Figure 8:
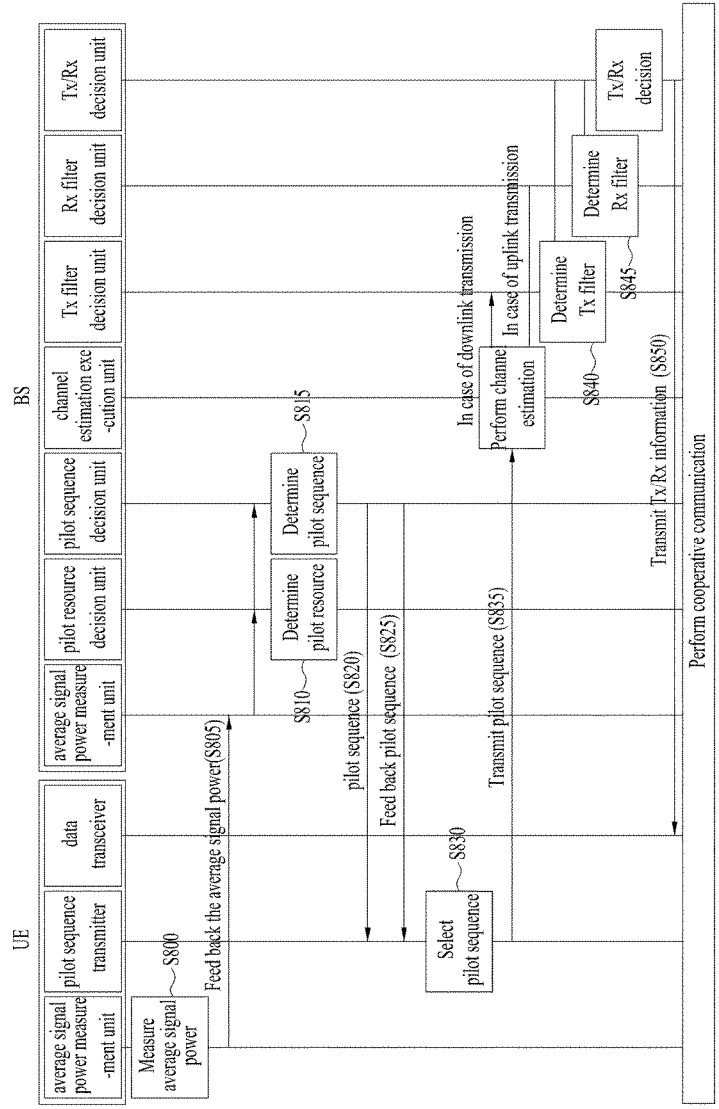
FIG. 8 is a flowchart illustrating functional blocks of processes of a UE and a BS for inter-cell cooperative communication according to an embodiment.

FIG. 8 is a flowchart illustrating functional blocks of processes of a UE and a BS for inter-cell cooperative communication according to an embodiment.

Referring to FIG. 8, the average signal power measurement unit of the UE may measure the signal power of a contiguous BS in step S800, and feed back the measured signal power to the BS in step S805. The average signal power measurement unit of the BS may measure the signal power of contiguous UEs, and may store the measured result in the memory. The UE may periodically feed back the average signal power, or may feed back the average signal power upon receiving a request of the BS. The contiguous BSs may exchange the average signal fed back from the UE or the average signal power measured by the BS with each other through a backhaul. The average signal power received by each BS through a backhaul may be stored in the average power storage unit from among memories of the BS. The BS may determine pilot resources to be used in each cell using the average signal power information received through a backhaul in step S810, and may feed back the determined information to the UE in step S820. Upon determination of the pilot resources, the BS may allocate (determine) the pilot sequences to be used in the UE in step S815, and may feed back the allocated pilot sequence to the UE in step S825. The BS may store information regarding the pilot sequence allocated to each UE in the pilot sequence storage unit from among memories of the BS, and the UE may store the pilot resource information and the pilot sequence information, which are fed back from the BS, in the pilot sequence storage unit from among memories of the UE in step S830. The pilot sequence transmitter of the UE may transmit the pilot sequence in uplink using the information stored in the pilot sequence storage unit in step S835. The BS may receive the pilot sequence from the UEs using pilot resources, and may estimate the RF channel between the UE and the BS. The RF channel information estimated by the BS may be stored in the channel estimation storage unit from among memories of the BS, and this information may be used to design the Tx/Rx filters for transmission and reception of data. In case of downlink transmission, the BS may construct the Tx filter through the Tx filter decision unit in step S840. In case of uplink transmission, the Rx filter is constructed in step S845. In this case, among memories of the BS, the average signal storage unit, the pilot sequence storage unit, the pilot allocation storage unit, and the channel estimation storage unit may be used. The Tx/Rx decision unit may determine a plurality of UEs to be used for cooperative transmission using the estimated channel information, the average signal power, and the Tx/Rx filters. The BS may feed back Tx/Rx decision information to the cooperative Tx UEs, and may inform the UEs of the Tx/Rx decision information in step S850.

Figure 9:
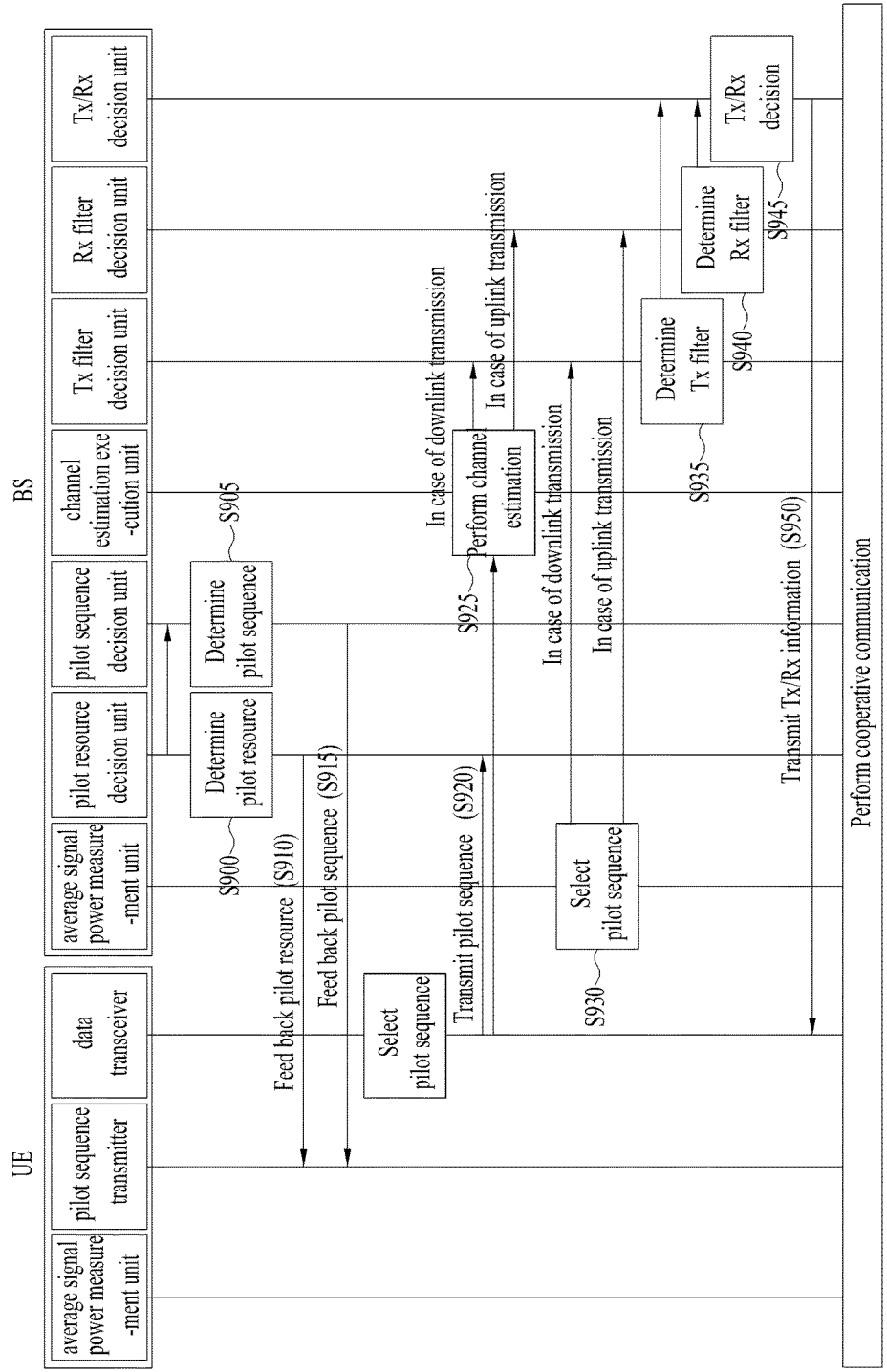
FIG. 9 is a flowchart illustrating functional blocks of processes of a UE and a BS for inter-cell cooperative communication according to another embodiment.

FIG. 9 is a flowchart illustrating functional blocks of processes of a UE and a BS for inter-cell cooperative communication according to another embodiment.

Referring to FIG. 9, pilot resources to be used in each cell may be determined using the UE average signal power information stored in the BS memory storage unit in step S900, and may be fed back to the UE in step S910. Upon determination of the pilot resources, the BS may allocate the pilot sequence to be used by the UE in step S905, and may feed back the allocated pilot sequence to the UE in step S915. The BS may store information regarding the pilot sequence allocated to each UE in the pilot sequence storage unit from among memories of the BS. The UE may store the pilot resource information and the pilot sequence information, which are fed back from the BS, in the pilot sequence storage unit from among memories of the UE. The pilot sequence transmitter of the UE may transmit the pilot sequence in uplink using the information stored in the pilot sequence storage unit from among memories of the UE in step S920. The BS may measure the average power of a signal received through pilot resources in step S930, and store the measured average power in the average signal power storage unit. The stored information may be used to determine the next pilot resources. The BS may receive the pilot sequence from the UEs through pilot resources, and may estimate the RF channel between the UE and the BS in step S925. The RF channel information estimated by the BS may be stored in the channel estimation storage unit from among memories of the BS, and this information may be used to design the Tx/Rx filter for transmission and reception of data. In case of downlink transmission, the BS may construct the Tx filter through the Tx filter decision unit in step S935. In case of uplink transmission, the Rx filter is constructed in step S940. In this case, among memories of the BS, the average signal power storage unit, the pilot sequence storage unit, the pilot allocation storage unit, and the channel estimation storage unit may be used. The Tx/Rx decision unit may determine a plurality of UEs to be used for cooperative transmission using the estimated channel information, the average signal power, and the Tx/Rx filters in step S945. The BS may feed back Tx/Rx decision information to the cooperative Tx UEs, and may inform the UEs of the Tx/Rx decision information in step S950.

Figure 10:
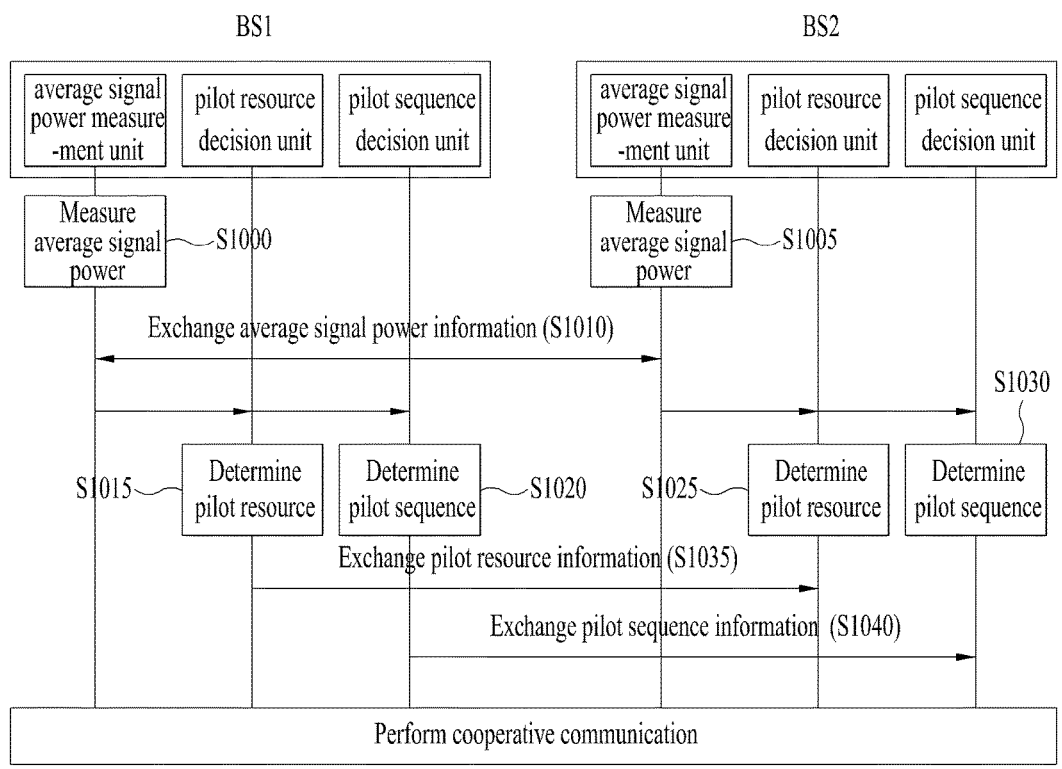
FIG. 10 is a flowchart illustrating the operations of functional blocks between BSs for inter-cell cooperative communication according to an embodiment.

FIG. 10 is a flowchart illustrating the operations of functional blocks between BSs for inter-cell cooperative communication according to an embodiment.

Referring to FIG. 10, the average signal power measurement units of a first BS (BS1) and a second BS (BS2) may measure the average signal power in steps S1000 and S1005, and may exchange the measured average signal power with each other in step S1010. BS1 and BS2 may determine pilot resources on the basis of the exchanged average signal power in step S1015 and S1025, and may exchange the determined pilot resource information with each other in step S1035. BS1 and BS2 may determine a UE pilot sequence on the basis of the exchanged pilot resource information in step S1020 and S1030, and may exchange the determined pilot sequence information in step S1040. From among the processors of the BS, the Tx filter decision unit, the Rx filter decision unit, and the Tx/Rx decision unit may perform the same functions as in FIG. 8.

Figure 11:
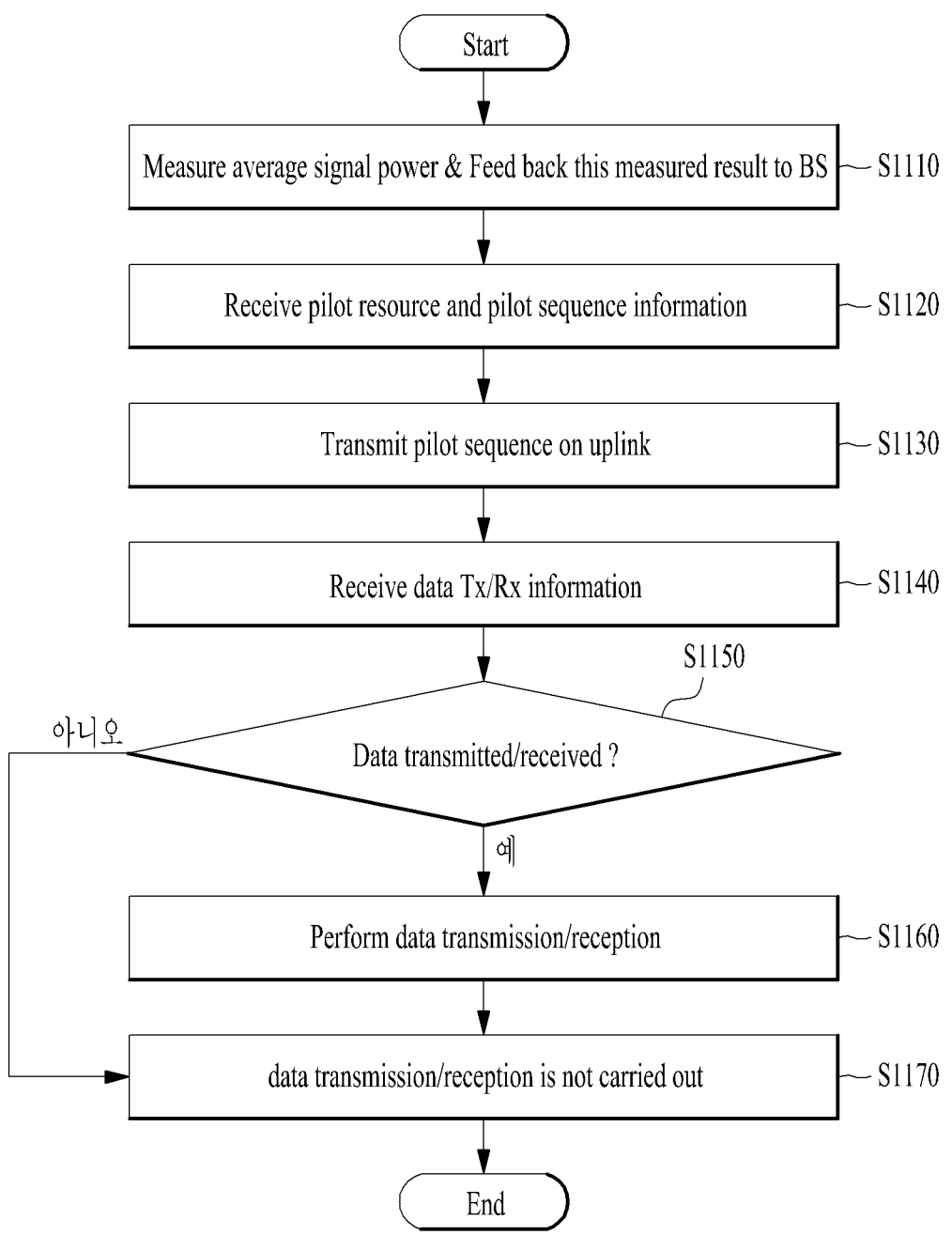
FIG. 11 is a flowchart illustrating a process for transmitting/receiving data of a UE according to an embodiment.

FIG. 11 is a flowchart illustrating the operations of a BS configured to perform cooperative communication according to an embodiment.

Referring to FIG. 11, the UE may measure the average signal power of a contiguous BS, and feed back the measured average signal power to the BS in step S1110. The UE may receive the pilot resource and pilot sequence information decided by the BS in step S1120. The UE may transmit the pilot sequence allocated through the corresponding pilot resources in step S1130. The UE may receive the Tx/Rx decision information from the BS in step S1140, and the UE may perform transmission and reception of data in step S1150. If the UE does not perform transmission and reception of data in step S1150, transmission and reception of data are not carried out in step S1170.

Figure 12:
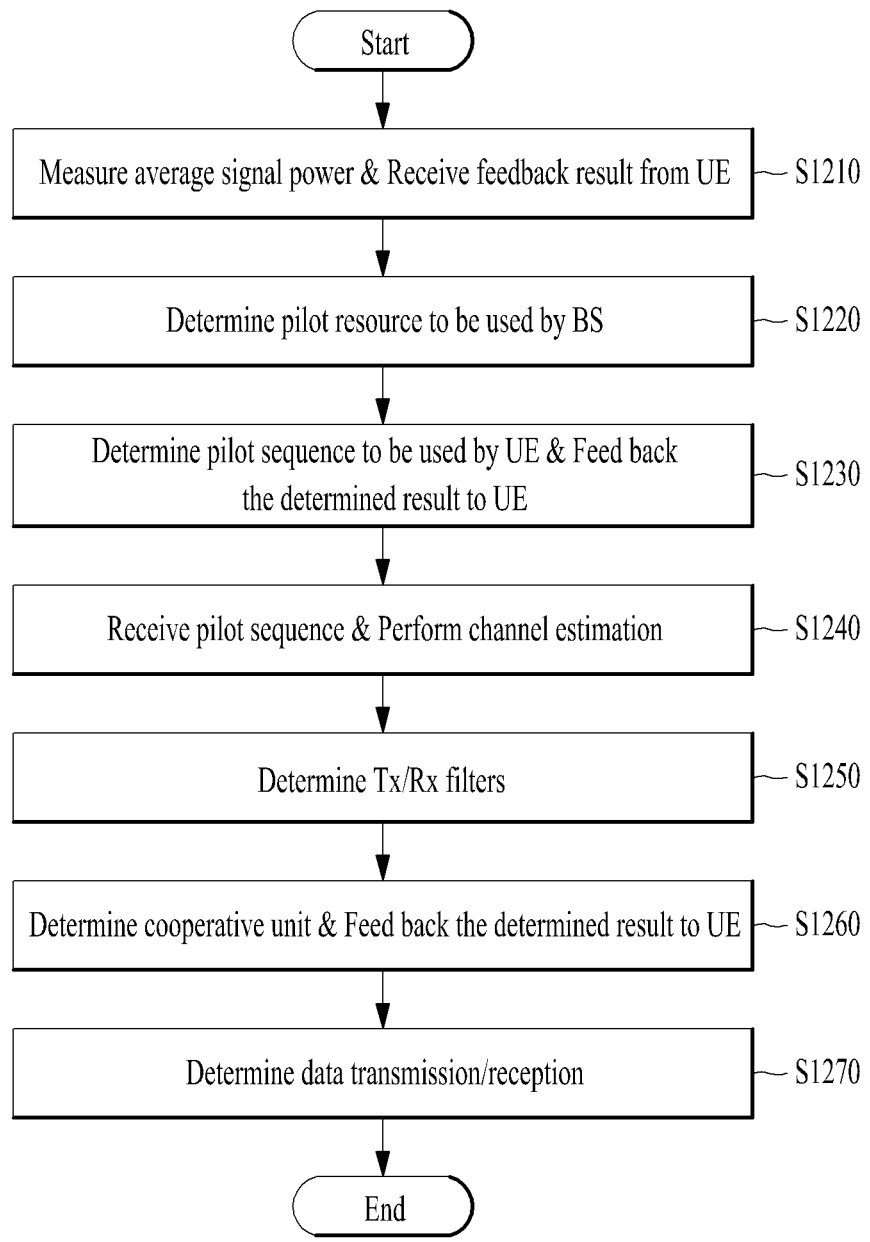
FIG. 12 is a flowchart illustrating a process for transmitting/receiving data of a BS according to an embodiment.

FIG. 12 is a flowchart illustrating the operations of a BS configured to perform cooperative communication according to an embodiment.

Referring to FIG. 12, the BS may measure the average signal power of contiguous UEs or may receive the average signal power from the contiguous UEs in step S1210. The BS may determine the pilot resources to be used using the average signal power in step S1220. The BS may determine the pilot sequence to be used by UEs, and may feed back the determined pilot sequence to UEs in step S1230. The BS may receive the pilot sequence from the UE, and may estimate a channel between the UE and the BS in step S1240. The BS may determine the Tx/Rx filters for communication with UEs in step S1250. The BS may determine a plurality of UEs to be used for cooperative communication, and may feed back the determined information to the UEs in step S1260. The BS may determine transmission and reception of data in step S1270.

The pilot resource decision unit from among the BS processors may determine the amount and position of resource blocks (RBs) to be used as pilot resources from among given RBs. In more detail, the system may have time, frequency, and code resource blocks. Some of total RBs $N_{tot}$ may be allocated as pilot resources. The amount of allocated pilot resources may be determined by referring to various information, for example, the number of UEs to be served by the BS, the number of BS and UE antennas, the average signal power of BS and UE, etc. An aggregate (or set) $P_l = \{p_{l1}, p_{l2}, \ldots\}$ of RBs to be used as pilot resources from among total RBs may be stored in the pilot resource storage unit from among memories of the l-th BS.

Pilot Resource Allocation

Figure 13:
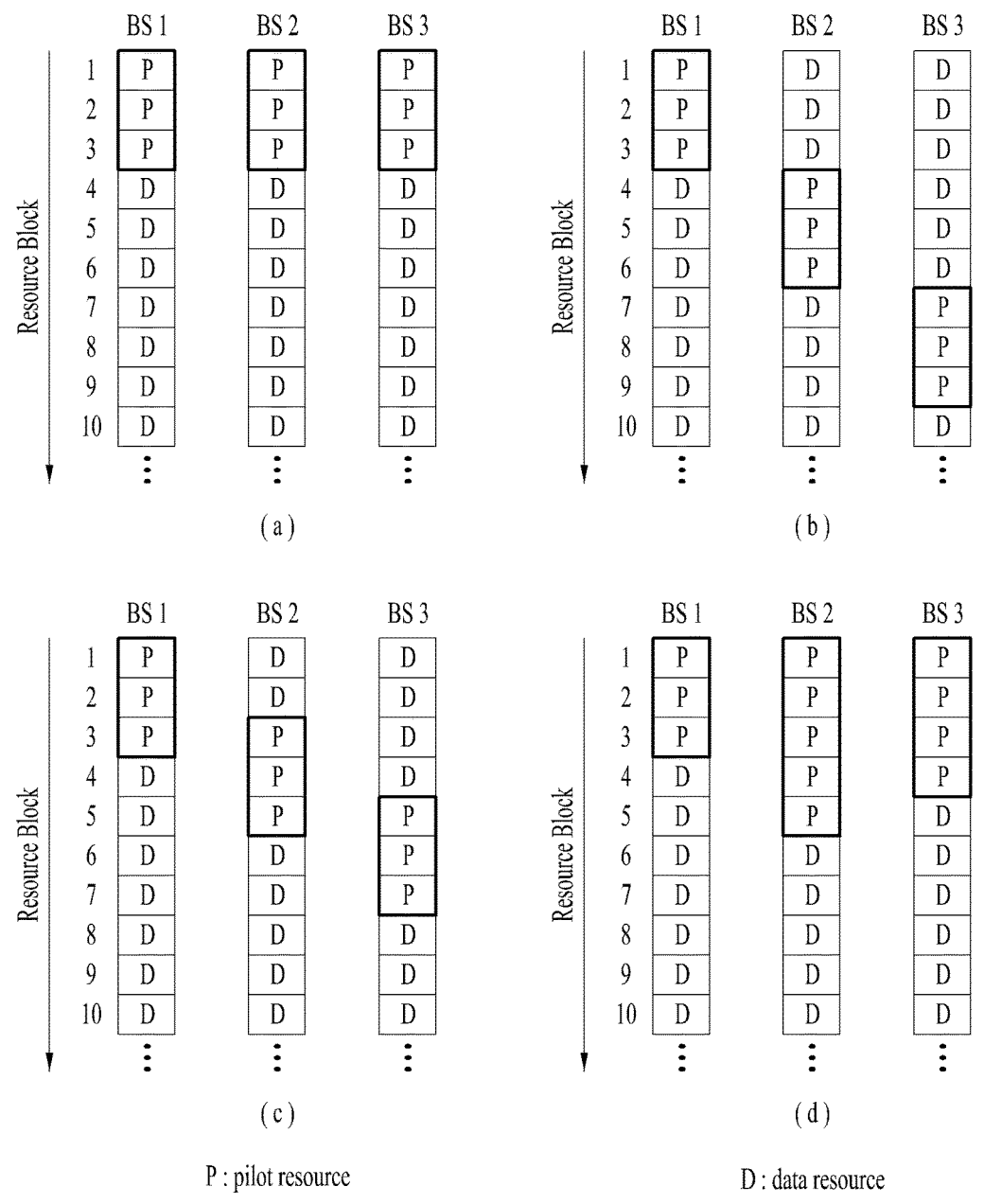

FIG. 13 illustrates various formats of pilot resources applied to the present invention.

Referring to FIG. 13(a), multiple BSs participating in cooperation may use the same pilot resources. In one embodiment, three BSs (BS1, BS2, BS3) participating in cooperation may respectively use three RBs (RB1, RB2, RB3) as pilot resources. The pilot resource storage unit from among memories of the BS may store $P_1=\{1,2,3\}$, $P_2=\{1,2,3\}$, $P_3=\{1,2,3\}$.

Referring to FIG. 13(b), multiple BSs participating in cooperation may use orthogonal pilot resources. In one embodiment, BS1 participating in cooperation may use three RBs (RB1, RB2, RBe) as the pilot resources. BS2 may use three RBs (RB4, RB4, RB6) as pilot resources, and BS3 may use three RBs (RB7, RB8, RB9). The pilot resource storage unit from among memories of the BS may store $P_1=\{1,2,3\}$, $P_2=\{4,5,6\}$, $P_3=\{7,8,9\}$.

Referring to FIG. 13(c), multiple BSs participating in cooperation may use the pilot resources in a manner that some RBs overlap with each other. In one embodiment, BS1 participating in cooperation may use three RBs (RB1, RB2, RB3) as pilot resources, BS2 may use three RBs (RB3, RB4, RB5) as pilot resources, and BS3 may use three RBs (RB5, RB6, RB7). The pilot resource storage unit from among memories of the BS may store $P_1=\{1,2,3\}$, $P_2=\{3,4,5\}$, $P_3=\{5,6,7\}$.

Referring to FIG. 13(d), individual BSs may use different sizes of resources as pilot resources. In one embodiment, BS1 may use three RBs (RB1, RB2, RB3) as pilot resources, BS2 may use five RBs (RB1, RB2, RB3, RB4, RB5) as pilot resources, and BS3 may use four RBs (RB1, RB2, RB3, RB4) as pilot resources. The pilot resource storage unit from among memories of the BS may store $P_1=\{1,2,3,\}$, $P_2=\{1,2,3,4,5\}$, $P_3=\{1,2,3,4\}$.

The pilot sequence decision unit from among processors of the BS may allocate the pilot sequence appropriate for given pilot resources to the UE. In this case, the BS and the UE may share pilot sequences appropriate for pilot resources in advance. The pilot sequences may be orthogonal to each other. For example, pseudo-random sequence, etc. may be used as the pilot sequences. The pilot allocation storage unit from among memories of the BS may store the pilot sequence allocated to each UE, and this information may be fed back to the UE. The UE may receive the pilot sequence information fed back from the BS, and may store the received information in the pilot sequence storage unit from among memories of the UE.

The orthogonal pilot sequence associated with the UE to which pilot resources are allocated, and the pilot reuse factor will hereinafter be described in detail. If P resource blocks (RBs) are allocated as pilot resources, assuming that the length of an available pilot sequence is set to P and the orthogonal pilots are used, a maximum of P orthogonal pilot sequences may be used. It is assumed that the orthogonal pilot sequence aggregation is denoted by $\Phi^P = \{\phi_1^P, \ldots, \phi_P^P\}$. In this case, the orthogonal pilot sequence having the length P is denoted by $\phi_i^P \in \mathbb{C}^P$, and has characteristics denoted by Equation 3.

$$(\phi_i^P)^H \phi_j^P = \begin{cases} P, & \text{if } i = j \\ 0, & \text{if } i \neq j \end{cases} \quad [\text{Equation 3}]$$

The pilot reuse factor is defined as "the number of given orthogonal pilot sequences—to—the number of UEs to which pilot resources are allocated", and is represented by the following equation 4.

$$f_P = \frac{K}{P} \quad [\text{Equation 4}]$$

In Equation 4, K is the number of UEs to which pilot resources are allocated. Definition of the pilot reuse factor is similar to definition of the frequency reuse factor of the legacy cellular system.

Figure 14:
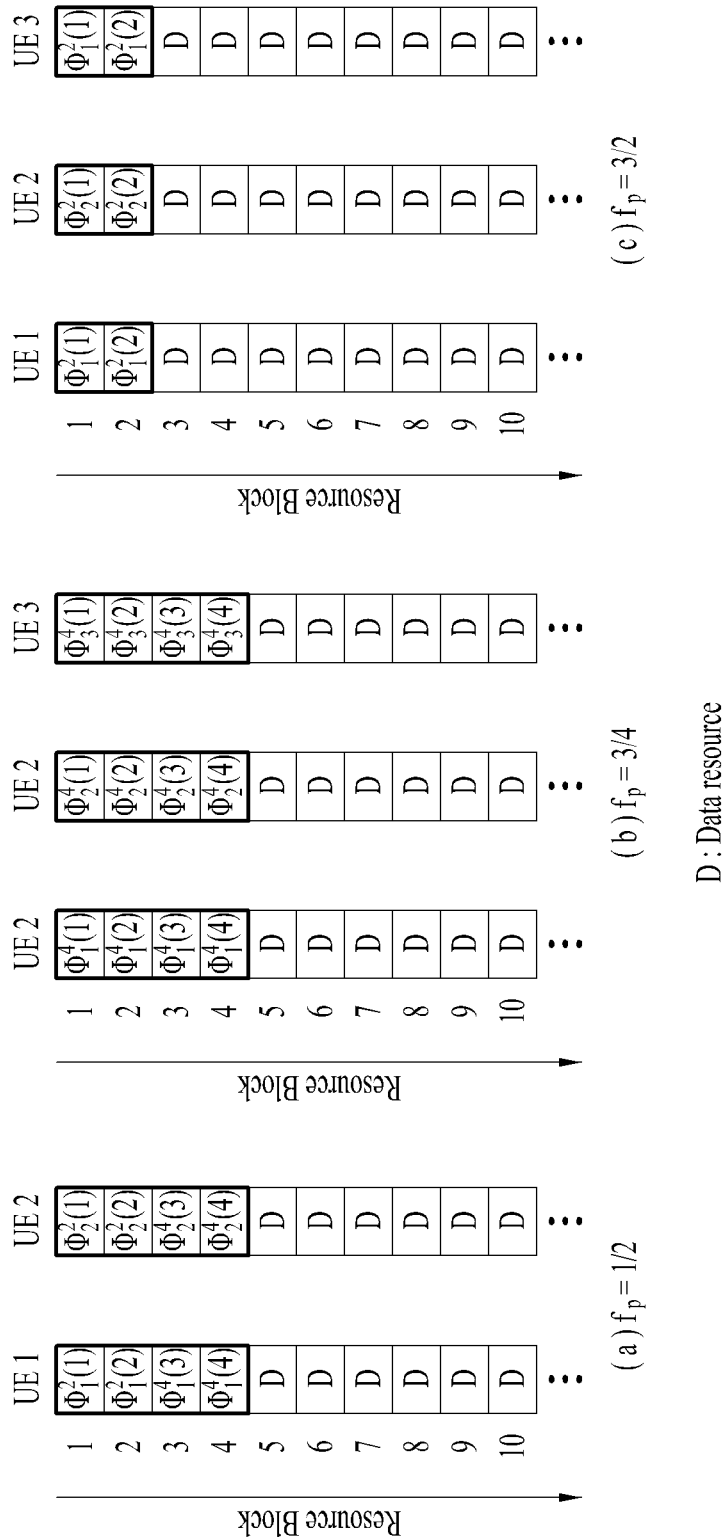
FIG. 14 illustrates various formats used when pilots are allocated to a UE according to an embodiment.

FIG. 14 illustrates pilot resources according to another embodiment.

Referring to FIG. 14, the pilot sequence decision unit from among processors of the BS may allocate the pilot resources corresponding to given pilot resources to respective UEs. The pilot resources may be classified into two states, i.e., an under-loaded state ($f_P \leq 1$) and an over-loaded state ($f_P > 1$), according to the pilot reuse factor. In this case, this under-loaded state may indicate that K UEs can receive the orthogonal pilot resources. The under-located state may independently estimate channels of UEs so that a high-quality estimation channel can be obtained. However, the number of UEs to be used for channel estimation is less than P, so that the number of UEs capable of participating in cooperative communication is reduced, resulting in reduction of performance or throughput. The over-loaded state may indicate that at least one of K UEs reuses the pilot sequence. In the over-loaded state, channels of a plurality of UEs can be estimated using a small amount of pilot resources, however, resulting in the occurrence of a considerably high estimation error.

Referring to FIG. 14(a), the BS may allocate one orthogonal pilot sequence $\phi_1^4$ from among orthogonal pilot sequences $\phi_1^4, \phi_2^4, \phi_3^4, \phi_4^4$ capable of being transmitted through RBs (RB1, RB2, RB3, RB4) to a first UE (UE1), and may allocate one orthogonal pilot sequence $\phi_2^4$ to a second UE (UE2). In this case, the pilot reuse factor is set to 1/2 (2 UEs/4 orthogonal sequences), and indicates an under-loaded situation.

Referring to FIG. 14(b), the BS may allocate one orthogonal pilot sequence $\phi_1^4$ from among the orthogonal pilot sequences ($\phi_1^4, \phi_2^4, \phi_3^4, \phi_4^4$) capable of being transmitted through four RBs (RB1, RB2, RB3, RB4) to a first UE (UE1), may allocate one orthogonal pilot sequence $\phi_2^4$ to a second UE (UE2), and may allocate one orthogonal pilot sequence $\phi_3^4$ to a third UE (UE3). In this case, the pilot reuse factor is set to 3/4, and may indicate an under-loaded situation.

Referring to FIG. 14(c), the BS may allocate one orthogonal pilot sequence $\phi_1^2$ from among the orthogonal pilot sequences ($\phi_1^2, \phi_2^2$) capable of being transmitted through two RBs (RB1, RB2) to a first UE (UE1), may allocate one orthogonal pilot sequence $\phi_2^2$ to a second UE (UE2), and may allocate one orthogonal pilot sequence $\phi_1^2$ to a third UE (UE3). In this case, the pilot sequence allocated to UE1 is re-allocated to UE3, so that the same pilot sequences can be shared between UE1 and UE3. In this case, the pilot reuse factor is set to 3/2, and may indicate an over-loaded situation. Therefore, during the over-loaded situation, two or more UEs use the same pilot sequences, so that the pilot sequence may be used as an interference signal for a specific UE from the viewpoint of the BS.

The pilot sequence storage unit from among memories of the BS may store the pilot sequence determined by the pilot sequence decision unit from among the processors of the BS. In addition, during the over-loaded situation, each UE may store information regarding other UEs configured to use the same pilot sequence as the pilot sequence allocated to the UE.

Referring to FIG. 14(c), UE1 and UE3 use the same pilot sequences $\phi_1^2$, and UE2 uses the pilot sequence $\phi_2^2$, so that UE1, UE2, and UE3 may respectively store $I_1 = \{1, 3\}$, $I_2 = \{2\}$, $I_3 = \{1, 3\}$. This information may be used in the channel estimation execution unit, the Tx filter decision unit, and the Rx filter decision unit.

Channel Estimation of BS

The BS may receive the pilot sequence from the UE after determining the previous pilot resources and the pilot sequences. The BS may estimate a channel between the UE and the BS using the received pilot sequence.

A channel estimation process for coherent transmission and reception in a time division wireless communication system is as follows. The BS and the UE may have various lengths of orthogonal sequences. For example, the orthogonal sequence having the length of 4 is denoted by the following expression $$\phi_1^4 = [1\ 0\ 0\ 0]^T,\ \phi_2^4 = [0\ 1\ 0\ 0]^T,\ \phi_3^4 = [0\ 0\ 1\ 0]^T,\ \phi_4^4 = [0\ 0\ 0\ 1]^T.$$

In this expression, $(\cdot)^T$ may denote a transpose.

The BS may allocate the pilot resource and sequence. The BS may inform the UE of the length of an orthogonal sequence to be used and the index of the orthogonal sequence. The index of an orthogonal sequence allocated to the k-th UE is denoted by M(k). For example, assuming that a message for commanding the k-th UE to use the orthogonal sequence having the length of 4 and the index of 3 is applied to the k-th UE, M(k) is denoted by M(k)=3.

The BS may transmit the uplink reference signal (RS). The UE may transmit the RS in uplink using the allocated orthogonal sequence. The RS of the k-th UE corresponding to the n-th timeslot is represented by the following expression $$s_k^{(p)}[n] = \phi_{M(k)}^H[n],\ n=1, \ldots, P$$

In this expression, P is the length of allocated pilots, and M(k) is an orthogonal sequence index of the k-th UE.

The channel estimation execution unit from among the processors of the BS may perform the following process so as to perform channel estimation. K UEs to which a pilot sequence is allocated may transmit the pilot sequence in uplink using given pilot resources. Each BS may receive superposed signals of reference signals (RSs) of UEs. The reference signals (RSs) received by the L-th BS are collected for a timeslot P, and as such a detailed description thereof is as follows. The signal received by the L-th BS is represented by the following equation 5.

$$Y_l^{(p)} = \sum_{k=1}^{K} \sqrt{\beta_{lk}}\, h_{lk} \phi_{M(k)}^H + V_l^{(p)}$$ [Equation 5]

In Equation 5, a superscript $^{(p)}$ is transmission of a pilot sequence, $V_l^{(p)}$ is a noise component, and M(k) is an index of a pilot allocated to the k-th UE. $\beta_{lk}$ is an average channel power between the k-th UE and the l-th RU, and indicates a large-scale fading. $h_{lk}$ may indicate small-scale fading. In order to estimate a channel of the k-th UE, the pilot sequence $$\frac{1}{P\sqrt{\beta_{lk}}} \phi_{M(k)}^P$$

allocated to the k-th UE is multiplied. That is, the estimated channel is represented by the following equation 6.

$$\hat{h}_{lk} = \frac{1}{P\sqrt{\beta_{lk}}} Y_l^{(p)} \phi_{M(k)} = h_{lk} + \sum_{j \in I_k \setminus (k)} \sqrt{\frac{\beta_{lj}}{\beta_{lk}}}\, h_{lj} + \tilde{v}_l^{(p)}$$ [Equation 6]

In Equation 6, $$\tilde{v}_l^{(p)} = \frac{1}{P\sqrt{\beta_{lk}}} V_l^{(p)} \phi_{M(k)}$$

is a noise component, and $I_k$ is an aggregate of indexes of UEs to which the same pilot sequence as that of the k-th UE is allocated. $h_{lk}$ is an objective channel of the BS. For reference, if the under-loaded situation ($f_p \leq 1$) is assumed, $I_k = \{k\}$ is obtained.

From among the processors of the BS, the Tx filter design unit and the Rx filter design unit may be designed using the estimated channel. The Tx filter W is used for downlink communication, and the Rx filter F is used for uplink communication. In downlink communication, the signal received by the k-th UE is represented by the following equation 7.

$$y_k^{(DL)} = g_k^H W s^{(DL)} + n_k^{(DL)}$$ [Equation 7]

In Equation 7, $g_k = [g_{1k}^H, g_{2k}^H, \ldots, g_{Lk}^H]^H$ is a channel vector, $n_k^{(DL)}$ is a downlink noise component, and $s^{(DL)}$ is a downlink Tx symbol vector. Therefore, the signal-to-interference noise ratio (SINR) of the k-th UE is represented by the following equation 8.

$$SINR_k^{(DL)} = \frac{|g_k^H w_k|^2}{\sum_{j \neq k} |g_k^H w_j|^2 + \sigma_n^2}$$ [Equation 8]

During uplink communication, the received signal having passed through the Rx filter $f_k$ is represented by the following equation 9.

$$x_k^{(UL)} = f_k^H(Gs^{(UL)} + n^{(UL)})$$ [Equation 9]

In Equation 9, $G = [g_1, g_2, \ldots, g_K]$ is a channel matrix, $n^{(UL)}$ is an uplink noise vector, and $s^{(UL)}$ is an uplink transmission symbol vector. SINR of the k-th UE is represented by the following equation 10.

$$SINR_k^{(UL)} = \frac{|f_k^H g_k|^2}{\sum_{j \neq k} |f_k^H g_j|^2 + \sigma_n^2 \|f_k\|^2}$$ [Equation 10]

The Tx/Rx filter proposed by the present invention aims to remove interference generated from other UEs. A condition for removing interference on downlink is represented by the following equation 11.

$$|g_k^H w_j|^2 = \begin{cases} 1 & \text{if } j = k \\ 0 & \text{if } j \neq k \end{cases}$$ [Equation 11]

A condition for removing interference on uplink is represented by the following equation 12.

$$|f_k^H g_j|^2 = \begin{cases} 1 & \text{if } j = k \\ 0 & \text{if } j \neq k \end{cases}$$ [Equation 12]

When the BS perfectly recognizes channel information of UEs, the Tx/Rx filter satisfying the above-mentioned condition can be readily appreciated by those skilled in the art. However, since the BS does not perfectly recognize channel information, it is impossible to perfectly remove interference. As the number of BS antennas increases, the scheme proposed by the present invention is designed to asymptotically satisfy a condition. Specifically, the condition for asymptotically removing downlink interference is represented by the following equation 13.

$$|g_k^H w_j|^2 = \begin{cases} 1 & \text{if } j = k \\ 0 & \text{if } j \neq k \end{cases} \text{ as } M \to \infty$$ [Equation 13]

In addition, the condition for asymptotically removing uplink interference is represented by the following equation 14.

$$|f_k^H g_j|^2 = \begin{cases} 1 & \text{if } j = k \\ 0 & \text{if } j \neq k \end{cases} \text{ as } M \to \infty$$ [Equation 14]

Design of Reception (Rx) Filter

Figure 15:
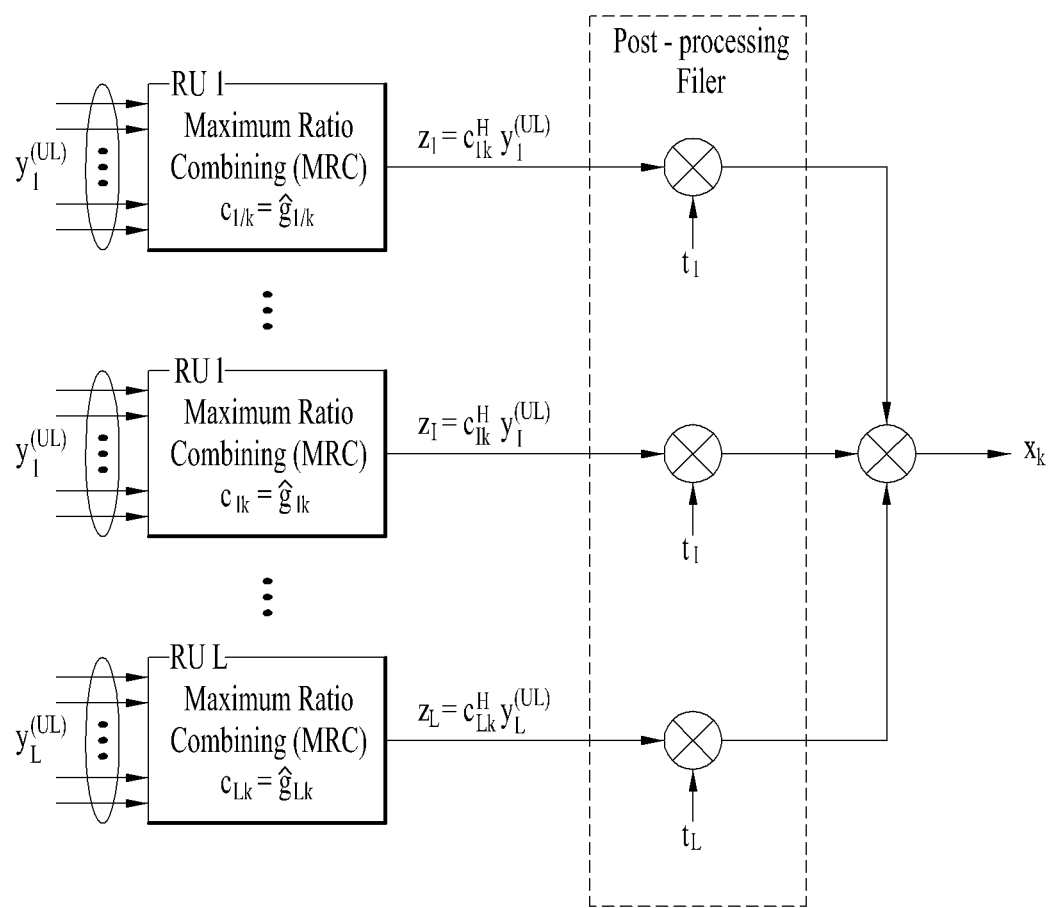
FIG. 15 illustrates a reception (Rx) filter structure according to an embodiment.

FIG. 15 illustrates a reception (Rx) filter structure according to an embodiment.

Referring to FIG. 15, the proposed Rx filter structure can be classified into a two parts (i.e., a first part and a second part). In the first part, the maximum ratio combining (MRC) filter $c_{lk}$ is used in a reception (Rx) filter at each RU port. In the second part, the result obtained from the MRC filter passes through the post-processing filter $t_k$. The MRC filter for detecting a signal of the K-th UE at the L-th RU is represented by the following equation 15.

$$c_{lk} = \hat{g}_{lk}$$ [Equation 15]

A total reception (Rx) filter is represented by the following equation 16.

$$f_{lk} = t_k \hat{g}_{lk}$$ [Equation 16]

In this case, the condition for asymptotically removing uplink interference using the total Rx filter is represented by the following equation 17.

$$\left| t_k \sum_{l=1}^{L} \hat{g}_{lk}^H g_{lk} \right|^2 \to 1, \quad \sum_{j=1, j \neq k}^{K} \left| t_k \sum_{l=1}^{L} \hat{g}_{lk}^H g_{lj} \right|^2 \to 0 \text{ as } M \to \infty \quad \text{[Equation 17]}$$

If $I_k = \{1, \ldots, S\}$ is assumed without generality, the post-processing filter $t_1, t_2, \ldots, t_S$ can be obtained from the following equation 18.

$$[t_1, t_2, \ldots, t_S] = \begin{bmatrix} \beta_{11} & \beta_{12} & \cdots & \beta_{1S} \\ \beta_{21} & \beta_{22} & & \beta_{2S} \\ \vdots & & \ddots & \vdots \\ \beta_{L1} & \beta_{L2} & \cdots & \beta_{LS} \end{bmatrix}^\dagger \quad \text{[Equation 18]}$$

In Equation 18, $A^\dagger$ is a pseudo-inverse matrix of the matrix A, and is denoted by $A^\dagger = A(A^H A)^{-1}$.

Design of Transmission (Tx) Filter

Figure 16:
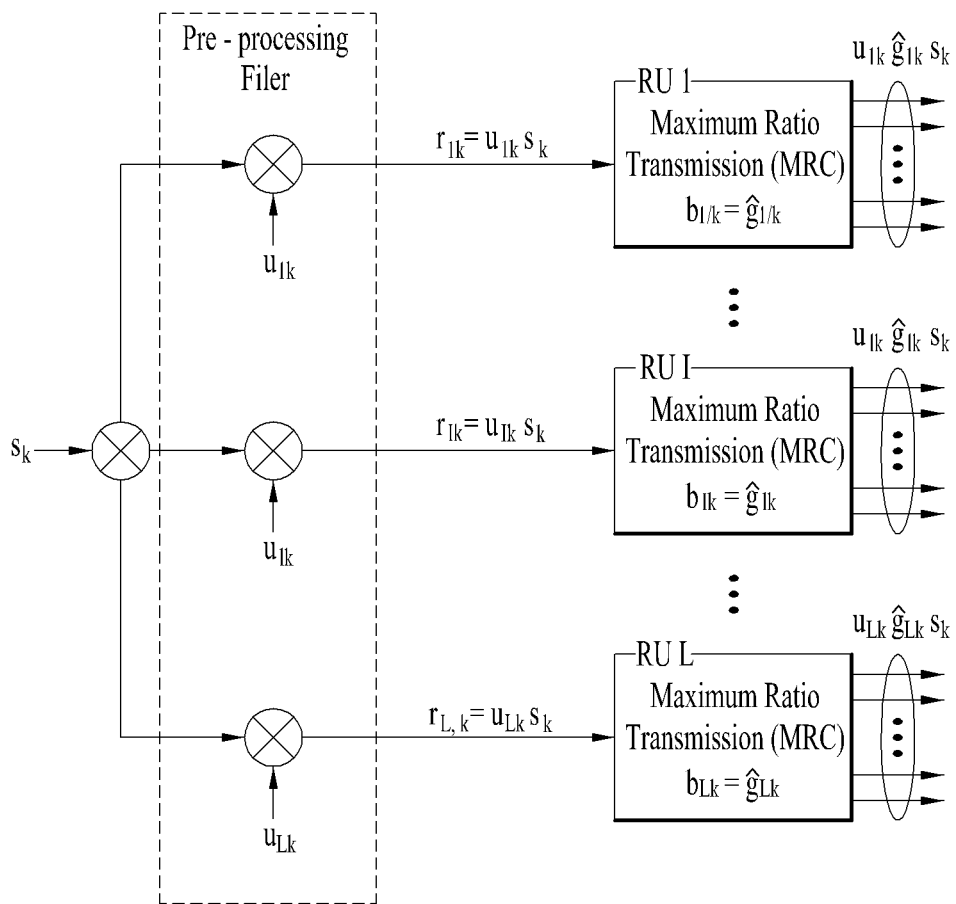
FIG. 16 illustrates a transmission (Tx) filter structure according to an embodiment.

FIG. 16 illustrates a transmission (Tx) filter structure according to an embodiment.

Referring to FIG. 16, the proposed Rx filter structure is classified into two parts, i.e., a first part and a second part. In the first part, the pre-processing matrix filter $U = [u_1, \ldots, u_K]$ is used. In the second part, the signal having passed through the pre-processing filter passes through the maximum ratio transmission (MRT) filter $b_{lk}$. The MRT filter for the K-th UE at the L-th RU is represented by the following equation 19.

$$b_{lk} = g_{lk} \quad \text{[Equation 19]}$$

A total transmission (Tx) filter is represented by the following equation 20.

$$w_{lk} = u_k \hat{g}_{lk} \quad \text{[Equation 20]}$$

In Equation 20, the condition for asymptotically removing downlink interference is represented by the following equation 21.

$$\left| u_k \sum_{l=1}^{L} g_{lk}^H \hat{g}_{lk} \right|^2 \to 1,$$

$$\sum_{j=1, j \neq k}^{K} \left| u_k \sum_{l=1}^{L} g_{lj}^H \hat{g}_{lk} \right|^2 \to 0 \text{ as } M \to \infty \quad \text{[Equation 21]}$$

If $I_k = \{1, \ldots, S\}$ is assumed without generality, the pre-processing filter $u_1, u_2, \ldots, u_S$ can be obtained from the following equation 22.

$$[u_1, u_2, \ldots, u_S] = \begin{bmatrix} \beta_{11} & \beta_{12} & \cdots & \beta_{1S} \\ \beta_{21} & \beta_{22} & & \beta_{2S} \\ \vdots & & \ddots & \vdots \\ \beta_{L1} & \beta_{L2} & \cdots & \beta_{LS} \end{bmatrix}^\dagger \quad \text{[Equation 22]}$$

FIGS. 15 and 16 illustrate various methods for designing the Tx/Rx filters using MRC/MRT and the post/pre filters. Compared to the legacy Tx/Rx filter design method, the added part is the use of post/pre filters configured to remove interference caused by reused pilots. The shape of the post/pre filters is denoted by an inverse matrix of an L×S matrix. Therefore, additional calculation complexity for generating the post filter $t_k$ and the pre filter $u_k$ is denoted by O(LS). For reference, S is determined by the pilot reuse factor $f_P$, and satisfies $S \leq \lceil f_P \rceil$. As a result, the additional calculation complexity is less than $O(L\lceil f_P \rceil)$.

Figure 17:
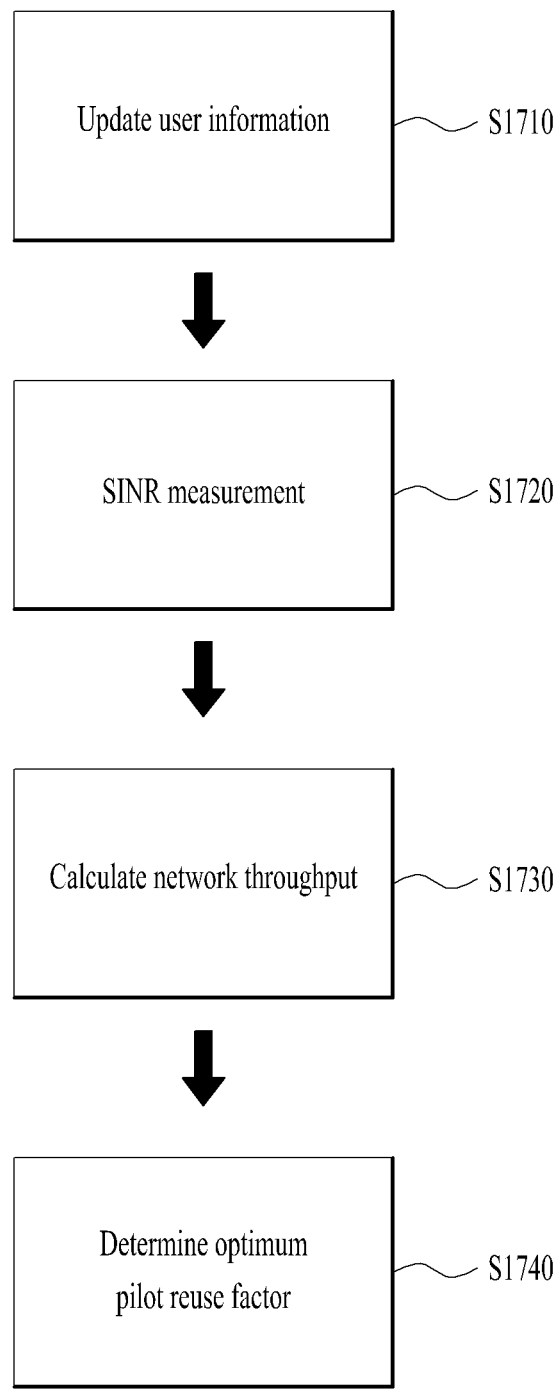
FIG. 17 is a flowchart illustrating a method for increasing a transfer rate of a BS by adaptively changing a pilot reuse factor ($f_P$) according to an embodiment.

FIG. 17 is a flowchart illustrating a method for increasing a transfer rate of a BS by adaptively changing a pilot reuse factor $(f_P)$ according to an embodiment.

If a new UE is generated in the cell region or is removed from the legacy UE cell region, the BS may generate new user association. Due to the change of such UE information, the used pilot reuse factor may be inefficient. In order to adaptively change this pilot reuse factor, the BS may calculate SINR of all UEs using the equation 10 in case of uplink, and may calculate SINR of all UEs using the equation 12 in case of downlink. Thereafter, the BS may calculate UL/DL network throughput using the following equation 23.

$$C^{(UL)} = (N_{tot} - P) \sum_{k=l}^{K} \log(1 + SINR_k^{(UL)}) \quad \text{[Equation 23]}$$

$$C^{(DL)} = (N_{tot} - P) \sum_{k=l}^{K} \log(1 + SINR_k^{(DL)}) \quad \text{[Equation 24]}$$

In Equation 24, $N_{tot}$ is a total number of orthogonal resource blocks (RBs). In the end, the BS may determine the number K of UEs, the number P of pilot resources, and the pilot reuse factor $f_P$, which are capable of maximizing the UL/DL network throughput.

INDUSTRIAL APPLICABILITY

The aforementioned embodiments of the present invention have been described in terms of a multi-cell cooperative communication system, but the present invention may be applied to various mobile communication systems using the same or equivalent principles.

The invention claimed is:

1. A method for transmitting and receiving a signal in a wireless communication system, the method comprising:
receiving, by a base station (BS), first pilot signals from a plurality of user equipments (UEs);
receiving, by the BS, second pilot signals from a cooperative BS when the BS communicates with the plurality of UEs based on a multi-cell cooperative communication system,
wherein the second pilot signals are received by the cooperative base station from the plurality of UEs;
estimating a communication channel associated with the plurality of UEs based on the first pilot signals and the second pilot signals;
obtaining channel information using the estimated communication channel;
determining, by the BS, a reception (Rx) filter using the obtained channel information;
receiving a data signal from a first UE among the plurality of UEs; and
removing an interference signal contained in the data signal using the determined Rx filter, wherein the Rx filter is configured to remove the interference signal by multiplying the data signal by a weight matrix, wherein the interference signal is caused by UEs other than the first UE among the plurality of UEs, and wherein the weight matrix is obtained by using an average power of signals transmitted from the BS to the plurality of UEs.

2. The method according to claim 1, wherein the Rx filter is configured to remove an interference signal contained in a signal filtered by a maximum ratio combining (MRC) filter using the data signal.

3. The method according to claim 1, wherein the weight matrix [t1, t2, . . . ts] is a pseudo-inverse matrix of an (L×S)-sized matrix denoted by the following expression:

$$[t_1, t_2, \ldots, t_S] = \begin{bmatrix} \beta_{11} & \beta_{12} & \ldots & \beta_{1S} \\ \beta_{21} & \beta_{22} & & \beta_{2S} \\ \vdots & & \ddots & \vdots \\ \beta_{L1} & \beta_{L2} & \ldots & \beta_{LS} \end{bmatrix}^\dagger,$$

where, $\beta_{LS}$ is an average power of signals transmitted from an L-th BS to a S-th UE, L is a total number of BSs, S is the number of UEs configured to transmit the same pilot signal, and $A^\dagger$ is a pseudo-inverse matrix of a matrix A, and is represented by $A^\dagger = A(A^H A)^{-1}$.

4. The method according to claim 1, wherein, after the BS receives signal power information measured by at least one UE adjacent to the BS, pilot signal received from the first UE is determined based on the measured signal power information.

5. The method according to claim 1, wherein the first pilot signals are determined based on UE average signal power information measured by the BS.

6. The method according to claim 5, wherein the average signal power information of the UE is exchanged between the BS and the cooperative BS.

7. The method according to claim 5, wherein the first pilot signals are exchanged between the BS and the cooperative BS.

8. The method according to claim 1, wherein the first pilot signals are allocated to the same resource block as in the second pilot signals.

9. The method according to claim 1, wherein the first pilot signals are allocated to resource blocks orthogonal to the second pilot signals.

10. The method according to claim 1, wherein the first pilot signals are allocated to resource blocks orthogonal to some parts of the second pilot signals.

11. The method according to claim 1, wherein the first pilot signals are different in size from the second pilot signals.

12. The method according to claim 1, wherein if the number of UEs capable of performing channel estimation is less than the number of resource blocks to which pilot signal is allocated, the UE transmits an orthogonal pilot signal to the BS.

13. The method according to claim 1, wherein if the number of UEs capable of performing channel estimation is higher than the number of resource blocks to which a pilot signal received from the first UE is allocated, the first UE transmits the same pilot signal as pilot signals transmitted from other UEs to the BS.

14. The method according to claim 1, wherein the interference signal is gradually reduced in proportion to the number of antennas of the BS.

15. A base station (BS) apparatus for transmitting and receiving a signal in a wireless communication system, the BS comprising:

a transceiver; and a processor, wherein the processor is configured to:

receive first pilot signals from a plurality of user equipments (UEs) using the transceiver, receive second pilot signals from a cooperative BS when the BS communicates with the plurality of UEs based on a multi-cell cooperative communication system, wherein the second pilot signals are received by the cooperative BS from the plurality of UEs, estimate a communication channel associated with the plurality of UEs based on the first pilot signals and the second pilot signals, obtain channel information using the estimated communication channel, determine a reception (Rx) filter using the obtained channel information, receive a data signal from a first UE among the plurality of UEs, and remove an interference signal contained in the data signal using the determined Rx filter, wherein the Rx filter removes the interference signal by multiplying the data signal by a weight matrix, wherein the interference signal is caused by UEs other than the first UE among the plurality of UEs, and wherein the weight matrix is obtained by using an average power of signals transmitted from the BS to the plurality of UEs.

* * * * *